(12) United States Patent
Deng et al.

(10) Patent No.: US 12,156,254 B2
(45) Date of Patent: Nov. 26, 2024

(54) SIDELINK COLLISION DETECTION AND INDICATION

(71) Applicant: InterDigital Patent Holdings, Inc., Wilmington, DE (US)

(72) Inventors: Tao Deng, New York, NY (US); Tuong Duc Hoang, Montreal (CA); Moon-il Lee, Melville, NY (US); Martino M. Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/747,850

(22) Filed: Jun. 19, 2024

(65) Prior Publication Data
US 2024/0340959 A1   Oct. 10, 2024

Related U.S. Application Data

(63) Continuation of application No. 18/681,286, filed as application No. PCT/US2022/038428 on Jul. 27, 2022.

(Continued)

(51) Int. Cl.
*H04W 74/0808* (2024.01)
*H04W 92/18* (2009.01)

(52) U.S. Cl.
CPC ........ *H04W 74/0825* (2013.01); *H04W 92/18* (2013.01)

(58) Field of Classification Search
CPC ........... H04W 74/002; H04W 74/0825; H04W 72/40; H04W 72/25; H04W 24/08; H04W 72/53; H04W 92/18; H04B 17/328
See application file for complete search history.

(56) References Cited

U.S. PATENT DOCUMENTS

| | | | |
|---|---|---|---|
| 11,570,754 B2* | 1/2023 | Freda | H04W 72/51 |
| 11,683,787 B2* | 6/2023 | Li | H04W 28/0215 |
| | | | 370/329 |

(Continued)

OTHER PUBLICATIONS

3rd Generation Partnership Project (3GPP), R1-2104386, "Discussion on Mode 2 Enhancements", Vivo, 3GPP TSG RAN WG1 #105-e, e-Meeting, May 10-27, 2021, pp. 1-10.

(Continued)

*Primary Examiner* — Ahmed Elallam
(74) *Attorney, Agent, or Firm* — Condo Roccia Koptiw LLP

(57) ABSTRACT

Systems, methods, and instrumentalities are described herein for sidelink (SL) collision detection and indication (e.g., in new radio (NR) vehicular communications (V2X)). A wireless transmit/receive unit (WTRU) may send resource reservations (e.g., in sidelink control information (SCI)). A receiving (RX) WTRU may receive SCI from (e.g., multiple) transmitting (TX) WTRUs, where the TX WTRUs are reserving resources for transmission. The TX WTRUs may be unaware of the other TX WTRUs (e.g., unaware of the resources being reserved by other TX WTRUs). Resources may be in conflict, for example, if the reserved resources overlap (e.g., partially or completely). Collision may occur, for example, if multiple TX WTRUs reserve the resources in conflict for transmission and/or if the TX WTRUs reserving the resources in conflict for transmission do not reselect a non-conflicting resource.

19 Claims, 14 Drawing Sheets

Related U.S. Application Data

(60) Provisional application No. 63/249,260, filed on Sep. 28, 2021, provisional application No. 63/228,653, filed on Aug. 3, 2021.

(56) References Cited

U.S. PATENT DOCUMENTS

| | | | | |
|---|---|---|---|---|
| 11,864,207 | B2* | 1/2024 | Hwang | H04W 4/40 |
| 12,048,011 | B2* | 7/2024 | Hoang | H04W 76/28 |
| 2020/0367113 | A1* | 11/2020 | Tang | H04W 4/40 |
| 2022/0095280 | A1* | 3/2022 | Farag | H04W 72/23 |
| 2022/0150730 | A1* | 5/2022 | Freda | H04W 24/04 |
| 2022/0191744 | A1* | 6/2022 | Nguyen | H04W 72/20 |
| 2022/0369169 | A1* | 11/2022 | Ji | H04W 28/26 |
| 2023/0097401 | A1* | 3/2023 | Hwang | H04W 72/25 370/329 |
| 2023/0171796 | A1* | 6/2023 | Ji | H04W 72/566 370/329 |
| 2023/0362739 | A1* | 11/2023 | Zhao | H04L 1/1671 |
| 2023/0362973 | A1* | 11/2023 | Huang | H04W 72/542 |
| 2024/0015755 | A1* | 1/2024 | Pan | H04W 72/25 |
| 2024/0214940 | A1* | 6/2024 | Zhang | H04W 52/0216 |
| 2024/0237034 | A1* | 7/2024 | Nguyen | H04W 72/40 |
| 2024/0284503 | A1* | 8/2024 | Khoryaev | H04L 1/189 |

OTHER PUBLICATIONS

3rd Generation Partnership Project (3GPP), R1-2105650, "Inter-UE Coordination for Mode 2 Enhancements", Panasonic, 3GPP TSG RAN WG1 #105-e, e-Meeting, May 10-27, 2021, 8 pages.

$3^{rd}$ Generation Partnership Project (3GPP), R1-2105675, "On Inter-UE Coordination for Mode 2 Enhancement", InterDigital Inc., 3GPP TSG RAN WG1 #105e, e-Meeting, May 27, 2021, 8 pages.

$3^{rd}$ Generation Partnership Project (3GPP), RP-193257, "New WID on NR Sidelink Enhancement", LG Electronics, 3GPP TSG RAN Meeting #86, Sitges, Spain, Dec. 9-12, 2019, 6 pages.

* cited by examiner

SIDELINK COLLISION DETECTION AND INDICATION

CROSS-REFERENCE TO RELATED APPLICATIONS

This application is the continuation of U.S. patent application Ser. No. 18/681,286, filed Feb. 5, 2024, which is the National Stage Entry under 35 U.S.C. § 371 of Patent Cooperation Treaty Application No. PCT/US2022/038428, filed Jul. 27, 2022, which claims the benefit of U.S. Provisional Application 63/228,653, filed Aug. 3, 2021, and U.S. Provisional Application 63/249,260, filed Sep. 28, 2021, the contents of which are incorporated by reference in their entirety herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein for sidelink (SL) collision detection and indication (e.g., in new radio (NR) vehicular communications (V2X)). A wireless transmit/receive unit (WTRU) may send resource reservations (e.g., in sidelink control information (SCI)). A receiving (RX) WTRU may receive SCI from (e.g., multiple) transmitting (TX) WTRUs, where the TX WTRUs are reserving resources for transmission. The TX WTRUs may be unaware of the other TX WTRUs (e.g., unaware of the resources being reserved by other TX WTRUs). Resources may be in conflict, for example, if the reserved resources overlap (e.g., partially or completely). Collision may occur, for example, if multiple TX WTRUs reserve the resources in conflict for transmission and/or if the TX WTRUs reserving the resources in conflict for transmission do not reselect a non-conflicting resource.

An RX WTRU (e.g., first WTRU) may receive configuration information indicating a conflict detection processing time (e.g., time used by the RX WTRU to determine that there is a conflict and send a conflict indication). The RX WTRU may receive first SCI from a first TX WTRU (e.g., second WTRU). The first SCI may include an indication (e.g., first indication) that indicates a first resource, a first conflict indication setting, and/or a first priority value. The RX WTRU may receive an indication that indicates a conflict indication processing time, for example, associated with the first TX WTRU. The RX WTRU may determine a conflict detection triggering occasion (e.g., time window where the RX WTRU has sufficient time to detect a conflict and send a conflict indication, for example, to the first TX WTRU), for example, based at least on the conflict detection processing time and the first resource. The conflict detection triggering occasion may be determined, for example, based on the conflict detection processing time, the conflict indication processing time (e.g., associated with the first TX WTRU), and the first resource. The RX WTRU may receive second SCI from a second TX WTRU (e.g., third WTRU), for example, during the conflict detection triggering occasion. The second SCI may include an indication (e.g., second indication) that indicates a second resource, a second conflict indication setting, and/or a second priority value. The RX WTRU may determine that there is a conflict associated with the first resource and the second resource. The RX WTRU may determine that there is a conflict associated with the first resource and the second resource, for example, based on a determination that a measurement (e.g., reference signal received power (RSRP)) associated with the second SCI is greater than a first threshold. The RX WTRU may determine that there is a conflict associated with the first resource and the second resource, for example, based on a determination that the first resource overlaps (e.g., partially or completely) with the second resource. The RX WTRU may send a conflict indication, for example, to the first TX WTRU. The RX WTRU may send a conflict indication to the first TX WTRU, for example, based on a determination that the first conflict indication setting is enabled and the second conflict indication setting is disabled. The RX WTRU may send a conflict indication to the first TX WTRU, for example, based on a determination that the first conflict indication setting is enabled, the second conflict indication setting is enabled, and the first priority value is greater than the second priority value.

EXAMPLE NETWORKS FOR IMPLEMENTATION OF THE EMBODIMENTS

Systems, methods, and instrumentalities are described herein for sidelink (SL) collision detection and indication (e.g., in new radio (NR) vehicular communications (V2X)). A receiver (RX) wireless transmit/receive unit (WTRU) may determine triggering of conflict detection for one or multiple resource(s) reserved in a received SL control information (SCI) associated with a (pre)configured WTRU source and/or destination identifier (ID), for example, based on the information indicated in the received SCI (e.g. L1 priority and time resources) and/or (pre)configured parameters (e.g., channel busy ratio (CBR) and L1 priority threshold). An RX WTRU may detect conflict and/or conflict type, for example, based on SCI decoding in a set of SL slots, which may be determined, for example, based on the reserved time resource(s), reference signal received power (RSRP) threshold configuration, and/or indicated resource reservation period. An RX WTRU may determine a TX WTRU to transmit a physical sidelink indication channel (PSICH) transmission to indicate one-time resource re-selection, periodic resource re-selection, cancellation of re-transmission, etc., e.g., as a result of the detected conflict using a corresponding PSICH format and resource. TX WTRU behavior may be determined, for example, based upon receiving a PSICH transmission according to the PSICH information (e.g., including turning-off resource pre-emption).

Figure 1A:
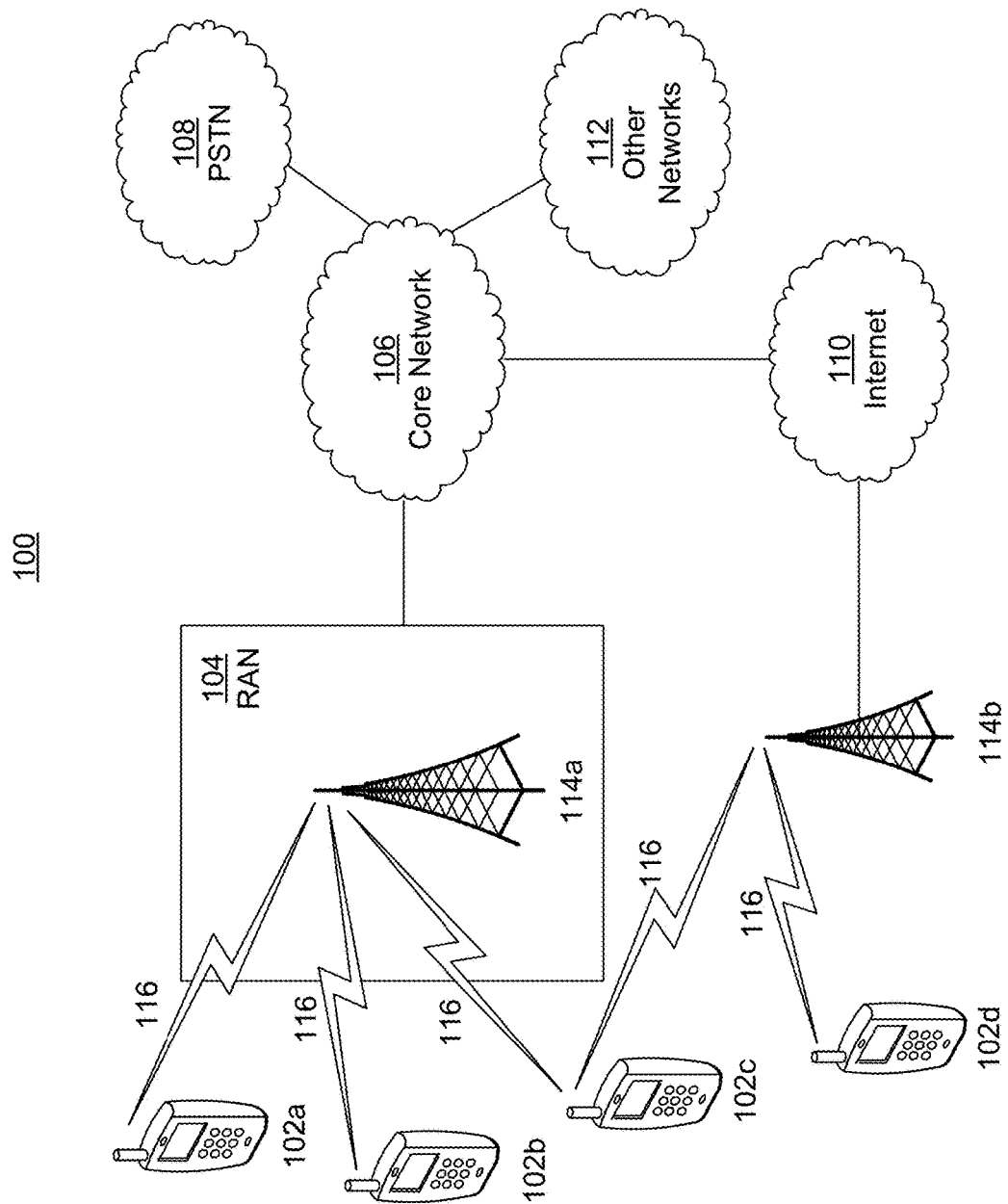
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
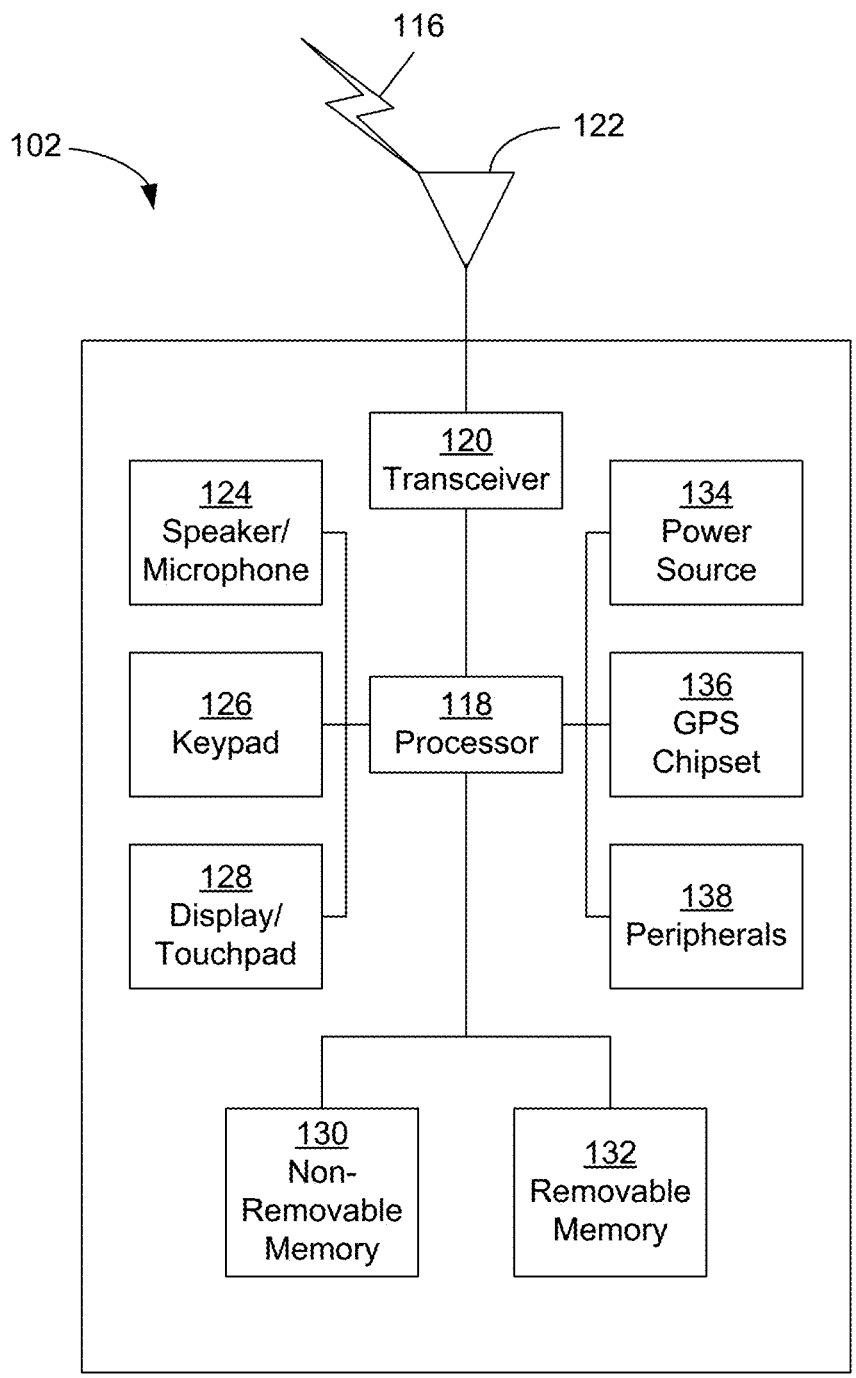
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth© module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
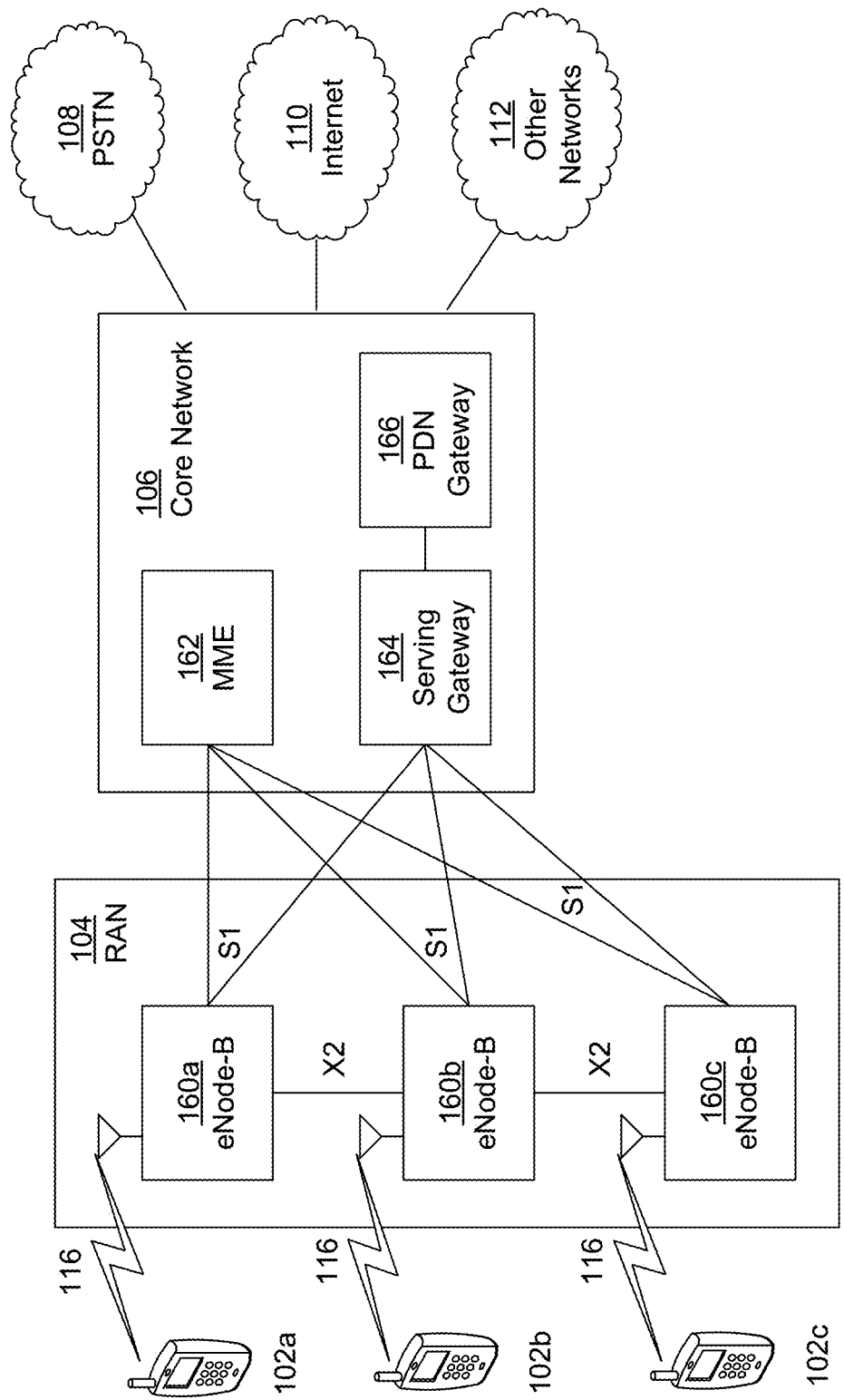
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
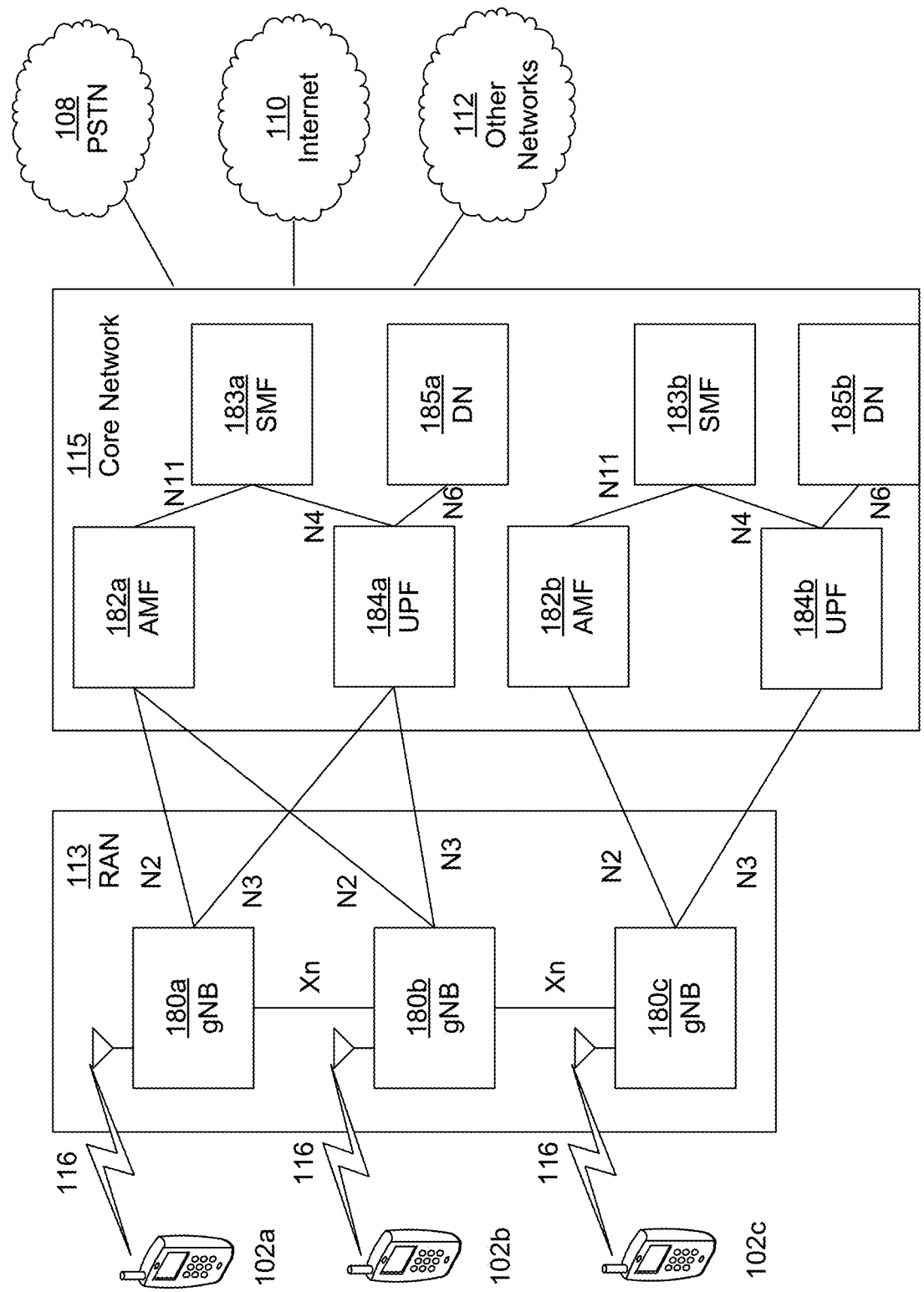
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein for sidelink (SL) collision detection and indication (e.g., in new radio (NR) vehicular communications (V2X)). A wireless transmit/receive unit (WTRU) may send resource reservations (e.g., in sidelink control information (SCI)). A receiving (RX) WTRU may receive SCI from (e.g., multiple) transmitting (TX) WTRUs, where the TX WTRUs are reserving resources for transmission. The TX WTRUs may be unaware of the other TX WTRUs (e.g., unaware of the resources being reserved by other TX WTRUs). Resources may be in conflict, for example, if the reserved resources overlap (e.g., partially or completely). Collision may occur, for example, if multiple TX WTRUs reserve the resources in conflict for transmission and/or if the TX WTRUs reserving the resources in conflict for transmission do not reselect a non-conflicting resource.

An RX WTRU (e.g., first WTRU) may receive configuration information indicating a conflict detection processing time (e.g., time used by the RX WTRU to determine that there is a conflict and send a conflict indication). The RX WTRU may receive first SCI from a first TX WTRU (e.g., second WTRU). The first SCI may include an indication (e.g., first indication) that indicates a first resource, a first conflict indication setting, and/or a first priority value. The RX WTRU may receive an indication that indicates a conflict indication processing time, for example, associated with the first TX WTRU. The RX WTRU may determine a conflict detection triggering occasion (e.g., time window where the RX WTRU has sufficient time to detect a conflict and send a conflict indication, for example, to the first TX WTRU), for example, based at least on the conflict detection processing time and the first resource. The conflict detection triggering occasion may be determined, for example, based on the conflict detection processing time, the conflict indication processing time (e.g., associated with the first TX WTRU), and the first resource. The RX WTRU may receive second SCI from a second TX WTRU (e.g., third WTRU), for example, during the conflict detection triggering occasion. The second SCI may include an indication (e.g., second indication) that indicates a second resource, a second conflict indication setting, and/or a second priority value. The RX WTRU may determine that there is a conflict associated with the first resource and the second resource. The RX WTRU may determine that there is a conflict associated with the first resource and the second resource, for example, based on a determination that a measurement (e.g., reference signal received power (RSRP)) associated with the second SCI is greater than a first threshold. The RX WTRU may determine that there is a conflict associated with the first resource and the second resource, for example, based on a determination that the first resource overlaps (e.g., partially or completely) with the second resource. The RX WTRU may send a conflict indication, for example, to the first TX WTRU. The RX WTRU may send a conflict indication to the first TX WTRU, for example, based on a determination that the first conflict indication setting is enabled and the second conflict indication setting is disabled. The RX WTRU may send a conflict indication to the first TX WTRU, for example, based on a determination that the first conflict indication setting is enabled, the second conflict indication setting is enabled, and the first priority value is greater than the second priority value.

A WTRU may determine detection of conflict in one or multiple aperiodic/periodic SL resources reserved by multiple Mode 2 WTRUs. An indication of a conflict may be provided to a (e.g., one) WTRU, for example, based on priority, time and frequency assignment and reservation interval period indicated in the SCI(s). A method of SL conflict detection and indication may include, for example, one or more of the following.

For example, a WTRU is configured with one or more of the following: a sub-set of WTRU source and/or destination IDs; an SL priority threshold (e.g., $Prio_{thre}$); an SL CBR threshold (e.g., $CBR_{thre}$); a conflict detection processing time (e.g., $T_{proc}$); a conflict indication transmission processing time (e.g., $T_{PSICH}$); an enabled/disabled indication for a conflict detection (e.g., ConflictDetEnabled); an enabled/disabled indication for a conflict indication (e.g., ConflictIndEnabled); an SL conflict detection RSRP threshold (e.g., $RSRP_{conflict}$); a PSICH format; and/or a PSICH resource configuration.

The WTRU may receive a resource reservation in an SCI from a first TX WTRU and/or may determine conflict detection triggering occasions and/or corresponding resource(s) for detection, for example, based on one or more of the following: a number of resources reserved in the SCI; a configured conflict detection processing time threshold; a configured conflict indication processing time threshold; a time resource assignment indicated in the receive SCIs; and/or a resource reservation period indicated in the received SCI. The WTRU may determine a conflict detection triggering occasion for an SP-based resource reservation including multiple (e.g., two) re-transmission resources.

The WTRU may (e.g., determine to) trigger a conflict detection at a determined conflict detection triggering condition, for example, based on one or more of the following: a priority indicated in a received SCI and/or a configured priority threshold (e.g., $Prio_{thre}$); a measured SL CBR and/or the configured CBR threshold (e.g., $CBR_{thre}$); a ConflictDetEnabled indicated in the received SCI; an RSRP; a distance; a TX WTRU power saving state; a resource allocation scheme; a TX WTRU type; a decoding status; and/or an HARQ feedback status.

The WTRU may detect a conflict in one or more resources of a determined conflict detection, for example, based on one or more of the following: a configured RSRP threshold; and/or an RSRP of an SCI transmission from a second TX WTRU reserving the same resource(s) measured in sensing.

The WTRU may determine a TX WTRU for a conflict indication transmission (e.g., PSICH) and a corresponding (e.g., PSICH) format and information, for example, based on one or more of the following: the priorities indicated in the SCIs by the first and second TX WTRU; a resource reservation period indicated in in the SCIs by the first and second TX WTRU; an enabled/disabled indication for a conflict indication (e.g., ConflictIndEnabled); and/or configured PSICH format(s).

The WTRU may determine the resource of the determined PSICH transmission, for example, based on one or more of the following: the configured PSICH resources; a source and/or destination ID of the determined TX WTRU; and/or a time and/or frequency resource assignment indicated in the SCI from determined TX WTRU.

The WTRU may transmit a PSICH in the determined resource to the determined TX WTRU.

For example, a WTRU such as a receiver (RX) WTRU may determine triggering of conflict detection for one or multiple resource(s) reserved in a received SL control information (SCI) associated with a (pre)configured WTRU source and/or destination identifier (ID), for example, based on the information indicated in the received SCI (e.g. L1 priority and time resources) and/or (pre)configured parameters (e.g., channel busy ratio (CBR) and L1 priority threshold).

The RX WTRU may detect conflict and/or conflict type, for example, based on SCI decoding in a set of SL slots, which may be determined, for example, based on the reserved time resource(s), reference signal received power (RSRP) threshold configuration, and/or indicated resource reservation period. Types of conflict may include a conflict specific to beamforming (e.g., FR2) operation, previously received SP-based reservation, SL/UL transmission, groupcast TX/RX conflict, and/or simultaneous partial overlapping and corresponding prioritization and indication transmissions.

The RX WTRU may determine a TX WTRU to transmit a physical sidelink indication channel (PSICH) transmission to indicate one-time resource re-selection, periodic resource re-selection, cancellation of re-transmission, etc., e.g., as a result of the detected conflict using a corresponding PSICH format and resource.

The TX WTRU behavior may be determined, for example, based upon receiving a PSICH transmission according to the PSICH information (e.g., including turning-off resource pre-emption).

The WTRU may determine a PSICH power setting. The WTRU may determine a PSICH power setting, for example, taking into account DL or SL path loss and concurrent PSICH and PSFCH transmissions. The PSICH power setting may be used for a PSICH transmission or concurrent PSICH and/or PSFCH transmissions. The WTRU may perform concurrent PSICH and PSFCH transmissions, for example, taking into account a prioritization. The prioritization may be based on an SL priority (e.g., associated with the PSICH and/or PSFCH transmissions).

The WTRU may (e.g., determine to) perform a conflict information transmission. The conflict information transmission may include information associated with a set of resources in conflict. The conflict information transmission may include a WTRU source and/or destination ID associated with the set of resources in conflict. The WTRU may perform a conflict information transmission, for example, to a TX WTRU. The TX WTRU may determine which set(s) of resources to use for a transmission, for example, based on the conflict information transmission WTRU source/destination ID, reference signal received power (RSRP), or TX-RX distance). The TX WTRU may combine the resources in the selected sets in the resource selection window.

An RX WTRU behavior of SCI decoding may be determined, for example, based on a resource information transmission to the TX WTRU. For example, the RX WTRU may determine to exclude (e.g., from a decoding resource allocation) resource candidates (e.g., PSCCH resource candidates) within the resources provided to the TX WTRU (e.g., in the resource information transmission). The RX WTRU may determine to prioritize (e.g., decoding)resource candidates (e.g., PSCCH resource candidates), for example, that are within the resource sets provided to the TX WTRU (e.g., conflict and non-conflict), for example, in the resource information transmission.

Inter-WTRU coordination may be enabled and/or provided. Resource allocation (e.g., Mode 2 resource allocation) may be improved (e.g., in terms of reliability). Mode 2 resource selection reliability may be impacted by hidden nodes, exposed nodes, half-duplex and/or uplink (UL)/sidelink (SL) transmission overlap. A transmitter (TX) WTRU (e.g., a Mode 2 TX WTRU) may perform a resource selection, for example, based on sensing, which may not detect issues. Multiple TX WTRUs may concurrently transmit at the same time and frequency resource, which may cause a collision. There may be persistent collisions between semi-persistently reserved transmissions, which may degrade the reliability of vehicular communication (V2X) services.

Inter-WTRU coordination may alleviate one or more issues. Coordination may enable a receiver (RX) WTRU to provide information to assist a TX WTRU's resource selection. The coordinated or shared information may include, for example, a set of (e.g., explicit) resources, which may be preferred or not preferred for a transmission from a TX WTRU. The coordinated or shared information may include, for example, an indication of conflict (e.g., implicitly) applicable to a resource that may be reserved by a TX WTRU.

A procedure to enable inter-WTRU coordination may be based on V2X design and/or a multitude of operation scenarios.

Excessive signaling overhead and congestion may be caused by conflict indication transmissions. SL control information (SCI) may reserve (e.g., additional) resources in subsequent SL slots, for example, if (e.g., when) an RX WTRU receives an SCI in a physical sidelink control channel (PSCCH) from a TX WTRU in an SL slot $y_0$ scheduling a physical sidelink shared channel (PSSCH)/PSCCH transmission over $L_{subCH}$ sub-channels in the same slot. Reserved resources may include, for example, multiple (e.g., two) resources for re-transmissions of a (e.g., the same) SL transport block (TB) slot (e.g., $y_1=y_0+T_1$ and $y_2=y_0+T_2$). Resources reserved in one or more SL slots (e.g., $y_0$, $y_1$ and $y_2$) may be (e.g., periodically) reserved in SL slots (e.g., $y_0+n*P_{rsvp\_TX}$, $y_1+n*P_{rsvp\_TX}$ and $y_2+n*P_{rsvp\_TX}$) for initial transmissions of a (e.g., new) TB and/or re-transmissions, for example, if (e.g., when) a resource reservation period (e.g., $P_{rsvp\_TX}$) is not equal to zero. There may be several WTRUs in proximity that can receive an SCI and perform conflict detection. The WTRUs (e.g., each of the several WTRUs) may transmit (e.g., several) indication transmissions. Signaling overhead and congestion may be reduced, for example, while improving reliability.

WTRU process capability may be improved (e.g., to overcome limitations) to detect, indicate, and/or act on conflict(s) for (e.g., all) resources reserved in an (e.g., one) SCI. A WTRU may utilize (e.g., sufficient) time and processing to perform a conflict detection (e.g., with high reliability) and prepare and transmit an (e.g., a subsequent) indication. A WTRU that receives an indication transmission to decode, process, and act upon the indication, may utilize more time. A WTRU may engage in V2X Mode 2 sensing and resource selection processing to detect and indicate a conflict for a (e.g., each) reserved resource (e.g., regardless of the pattern of the resources in the time domain). A WTRU that receives an indication may have capability, limited capability, or no capability to act upon the indication. For example, a vulnerable road user (VRU) type WTRU may not have a receiver and/or may perform random resource selection.

A WTRU may detect conflict(s) of resource(s), for example, indicated in a received SCI. A conflict may be detected for an SL resource. An indication of a conflict may be (pre)configured. A WTRU may receive configuration information indicating (e.g., be (pre)configured, e.g., by higher layers with), for example, one or more of the following (e.g., pertaining to SL resource conflict detection and indication): a sub-set of WTRU sources and/or destination identifiers (IDs); an SL priority threshold (e.g., $Prio_{thre}$); an SL channel busy ratio (CBR) threshold (e.g., $CBR_{thre}$); a conflict detection processing time (e.g., $T_{proc}$); a conflict indication transmission processing time (e.g., $T_{PSICH}$); an enabled/disabled indication for inter-WTRU coordination and/or conflict detection (e.g., ConflictDetEnabled); an enabled/disabled indication for inter-WTRU coordination and/or conflict indication (e.g., ConflictIndEnabled); an SL conflict detection reference signal received power (RSRP) threshold (e.g., $RSRP_{conflict}$); and/or a PSICH and/or PSFCH resource configuration for inter-WTRU coordination and/or conflict detection.

A WTRU may receive configuration information indicating (e.g., be (pre)configured, e.g., by higher layers with) a pair of WTRU source and/or destination IDs, e.g., for unicast SL transmissions and/or receptions. A WTRU may receive configuration information indicating (e.g., be (pre) configured, e.g., by higher layers with) a WTRU destination ID, e.g., for groupcast and/or unicast SL transmissions and receptions. A WTRU may receive configuration information (e.g., be (pre)configured with) one or more (e.g., a set of) WTRU sources and/or destination IDs, for example, based on supported services (e.g., V2X services) and/or applications (e.g., V2X applications). In some examples, a sub-set of WTRU sources and/or destination IDs may be indicated to be used (e.g., (pre)configured) for SL resource conflict and/or indication. A WTRU may perform SL resource conflict detection and indication, for example, on resource(s) reserved for SL transmissions associated with a sub-set of WTRU source and/or destination IDs.

In some examples, a WTRU may receive configuration information (e.g., be (pre)configured with) an SL priority threshold (e.g., $Prio_{thre}$) in an SL resource pool. A WTRU may (e.g., determine to) trigger an SL resource conflict detection and indication, for example, based on a (e.g., (pre)configured) $Prio_{thre}$ at a (e.g., within a) resource conflict detection triggering occasion. An SL priority threshold may (e.g., thus) enable conflict detection and indication for SL transmissions (e.g., with high priorities).

In some examples, a WTRU may receive configuration information indicating (e.g., be (pre)configured with) an SL CBR threshold (e.g., $CBR_{thre}$) in an SL resource pool. A WTRU may (e.g., determine to) trigger an SL resource conflict detection and indication, for example, based on the (e.g., (pre)configured) $CBR_{thre}$ at a (e.g., within a) resource conflict detection triggering occasion. An SL CBR threshold may regulate an increase in SL congestion, which may be caused by indication transmissions as a result of SL resource conflict detection.

A WTRU may receive configuration information indicating (e.g., be (pre)configured with) a WTRU conflict detection processing time threshold (e.g., $T_{proc}$). A conflict detection processing time threshold may correspond to a (e.g., minimum) time period (e.g., required) for a WTRU to perform a conflict detection (e.g., and transmit a resulting indication). A time threshold may be denoted, for example, in a number of SL slots. The value of a time threshold may be based on, for example, WTRU processing capability and/or sub-carrier spacing (SCS), for example, a SCS associated with a SL bandwidth part (BWP), e.g., a (pre) configured SL bandwidth part (BWP).

A WTRU may receive configuration information indicating (e.g., be (pre)configured with) a WTRU conflict indication processing time threshold (e.g., $T_{PSICH}$). A conflict indication processing time threshold may correspond to a (e.g., minimum) time period (e.g., required) for a WTRU to receive and decode a conflict indication (e.g., and perform the indicated operation, for example, such as resource reselection). A time threshold may be denoted, for example, in a number of SL slots. The value of a processing time threshold may be based on, for example, WTRU processing capability and/or a SCS, for example a SCS associated with a SL BWP (e.g., a (pre)configured SL BWP).

In some examples, an RX WTRU may determine a conflict detection triggering occasion (e.g., a latest conflict detection triggering occasion) for resource(s) reserved in a received SCI from a TX WTRU, e.g., based on $T_{proc}$ and/or $T_{PSICH}$. A RX WTRU may trigger a conflict detection close to a reserved SL slot, for example, to capture as many conflicting SL resource reservations as possible. Conflicting SL resource reservations may be reservations that may reserve partially or fully overlapping sub-channels in an SL slot (e.g., the same SL slot). The triggering of a conflict detection may occur, for example, (e.g., sufficiently early) to allow processing time for conflict detection and indication transmission at an RX WTRU and indication reception and indicated operation by a TX WTRU.

In some examples, a WTRU may receive (e.g., be (pre) configured with) an enabled/disabled indication for conflict detection (e.g., ConflictDetEnabled). A TX WTRU may include an indication of ConflictDetEnabled, for example, in an SCI of a PSSCH/PSCCH transmission. An RX WTRU may perform collision detection for resource(s) reserved in an SCI, for example, if (e.g., when) an indication for conflict detection is set as "enabled." A RX WTRU may refrain from performing (e.g., not perform) collision detection for the resource(s) reserved in an SCI, for example, if (e.g., when) an indication for conflict detection is set as "disabled."

In some examples, a WTRU may receive (e.g., be (pre) configured with) an enabled/disabled indication for conflict indication (e.g., ConflictIndEnabled). A TX WTRU may include an indication of ConflictIndEnabled, for example, in an SCI of a PSSCH/PSCCH transmission. An RX WTRU may transmit a conflict indication to a TX WTRU for (e.g., specific to) resource(s) reserved in the SCI, for example, if (e.g., when) the indication for conflict indication is set as "enabled." An RX WTRU may refrain from performing (e.g., not perform) a conflict indication transmission to a TX WTRU that reserved the resource(s) in the SCI, for example, if (e.g., when) the indication for conflict indication is set as "disabled."

The ConflictDetEnabled and ConflictIndEnabled SCI indications may support WTRUs with limited or no receiving capability (e.g., a VRU device without RX hardware (HW)). WTRUs (e.g., with limited or no receiving capability) may perform random resource selection without sensing. The resulting SL transmissions may be subject to heightened collisions. An SL resource detection for randomly selected resource(s) may improve transmission reliability. An indication transmission may be refrained from being performed (e.g., not be performed), for example, due to a HW limitation.

In some examples, a WTRU may receive configuration information indicating (e.g., be (pre)configured with) an SL conflict detection RSRP threshold (e.g., $RSRP_{conflict}$). A WTRU may determine that a conflict is detected in reserved resource(s), for example, based on the (e.g., (pre)configured) $RSRP_{conflict}$. An RX WTRU may determine a conflict is detected, for example, if (e.g., when) the measured RSRP is higher than an indicated (e.g., (pre)configured SL) conflict detection RSRP threshold (e.g., $RSRP_{conflict}$) The value of a (e.g., (pre)configured) SL conflict detection RSRP threshold may depend on, for example, the priorities indicated in the SCIs reserving (e.g., the same) resource(s) by different WTRUs.

In examples, a WTRU may receive configuration information indicating (e.g., be (pre)configured with) a PSICH and/or PSFCH resource(s) for inter-WTRU coordination and/or conflict detection. The resource configuration information may be associated with (e.g., specific for) a SL resource pool. If a PSCIH and/or PSFCH resource(s) is configured in a resource pool, a WTRU may determine that an inter-WTRU coordination and/or conflict detection and indication may be enabled, for example, and a WTRU may perform inter-WTRU coordination and/or conflict detection for SL transmissions (e.g., using the resources of the resource pool).

An RX WTRU may determine a conflict detection occasion(s) of resource(s) reserved in a received SCI. In some examples, an RX WTRU may determine a physical sidelink indication channel (PSICH) transmission occasion based on, for example, the PSICH resource configuration of a resource pool, which may be located (e.g., at least) $T_{PSICH}$ before a reserved SL slot for a (e.g., each) reserved resource. A (e.g., (pre)configured) periodicity of a PSICH transmission occasion may be, for example, one per SL slot, one per two SL slots, one per four SL slots, etc. A WTRU may determine a time offset (e.g., $T_{offset}$) between a determined PSICH transmission occasion and a reserved SL slot. For example, $T_{offset}$ may be set equal to $T_{PSICH}$ if (e.g., when) PSICH transmission periodicity is one per SL slot. $T_{offset}$ may be set equal to $T_{PSICH}$ or $T_{PSICH}+1$ (e.g., as shown by examples in FIGS. 2A-2D), for example, if (e.g., when) PSICH transmission periodicity is one per two SL slots, e.g., depending on the index of the reserved SL slot.

An RX WTRU may determine a (e.g., latest) conflict detection triggering occasion corresponding to a reserved resource, which may be located (e.g., at least) $T_{proc}$ before the determined PSICH transmission occasion. An RX WTRU may (e.g., thus) determine that a conflict detection triggering occasion for a reserved resource may occur (e.g., at least) $(T_{proc}+T_{offset})$ before the resource for the conflict detection.

FIGS. 2A-D illustrate examples of WTRU collision detection triggering occasion(s) for re-transmission resource(s) reservation.

An RX WTRU may determine conflict detection occasion(s) of resource(s) reserved in a received SCI for re-transmissions. An RX WTRU may determine one or multiple (e.g., latest) conflict detection occasion(s) for resource(s) reserved for re-transmissions in a received SCI in SL slot $y_0$, for example, based on one or more of the following: a conflict detection processing time (e.g., $T_{proc}$); a conflict indication transmission processing time (e.g., $T_{PSICH}$); one or more PSICH transmission occasions (e.g., (pre)configured) in a resource pool; a number of resources reserved in a received SCI; a time resource assignment (e.g., $T_1$) indicated in the received SCI for the resource reserved in an SL slot (e.g., $y_1=y_0+T_1$); and/or a time resource assignment (e.g., $T_2$) indicated in the received SCI for the resource reserved in an SL slot (e.g., $y_2=y_0+T_2$).

An RX WTRU may determine one or multiple (e.g., latest) conflict detection occasion(s) for resource(s) reserved for re-transmissions in a received SCI in SL slot $y_0$, for example, as described in one or more of the following examples. A (e.g., latest) conflict detection occasion may denote the time instance after which a WTRU may refrain from triggering (e.g., not trigger) a conflict detection. A WTRU may (e.g., determine to) trigger an inter-WTRU coordination and/or conflict detection in a conflict detection occasion (e.g., a SL slot (SL slot n)), for example, prior to the determined (e.g., latest) conflict detection occasion. The triggering may be based on (e.g., (pre)configured) conditions (e.g., as discussed herein).

In some examples, a (e.g., one) re-transmission resource may be reserved in SL slot $y_1=y_0+T_1$. As shown by example in FIG. 2A, $T_1>=T_{proc}+T_{offset}$. An RX WTRU may determine a latest conflict detection occasion in the SL slot $y_{trig}=y_0+T_1-T_{proc}-T_{offset}$ corresponding to the reserved re-transmission resource in SL slot $y_1$ (e.g., if $T_1>=T_{proc}+T_{offset}$). An RX WTRU may (e.g., determine to) refrain from performing (e.g., not perform) a conflict detection for the reserved resource, for example, if $T_1<T_{proc}+T_{offset}$.

In some examples, multiple (e.g., two) re-transmission resources may be reserved in SL slot $y_1=y_0+T_1$ and $y_2=y_0+T_2$. As shown by example in FIG. 2B, $T_1>=T_{proc}+T_{offset\_1}$ and $T_2-T_1>=T_{proc}+T_{offset\_2}$. An RX WTRU may determine multiple (e.g., two latest) conflict detection occasions. An RX WTRU may determine a conflict detection occasion to be, for example, in the SL slot $y_{trig\_1}=y_0+T_1-T_{proc}-T_{offset\_1}$ corresponding to the resource reserved in SL slot $y_1$. An RX WTRU may determine a conflict detection occasion to be, for example, in the SL slot $y_{trig\_2}=y_0+T_1-T_{proc}-T_{offset\_2}$ corresponding to the resource reserved in SL slot $y_2$.

In some examples, multiple (e.g., two) re-transmission resources may be reserved in SL slot $y_1=y_0+T_1$ and $y_2=y_0+T_2$. As shown by example in FIG. 2C, $T_1<T_{proc}+T_{offset}$ and $T_2-T_1>=T_{proc}+T_{offset}$. An RX WTRU may determine a latest conflict detection occasion in the SL slot $y_{trig}=y_0+T_2-T_{proc}-T_{offset\_2}$ corresponding to the reserved re-transmission resource in SL slot $y_2$. A RX WTRU may refrain from performing (e.g., not perform) a conflict detection for the reserved re-transmission resource in SL slot $y_1$.

In some examples, multiple (e.g., two) re-transmission resources may be reserved in SL slot $y_1=y_0+T_1$ and $y_2=y_0+T_2$. As shown by example in FIG. 2D, $T_1>=T_{proc}+T_{offset}$ and $T_2-T_1<T_{proc}+T_{offset}$. An RX WTRU may determine a (e.g., latest) conflict detection occasion in the SL slot $y_{trig}=y_0+T_1-T_{proc}-T_{offset\_1}$ corresponding to the reserved re-transmission resource in SL slots $y_1$ and $y_2$. An RX WTRU may perform a conflict detection for the reserved re-transmission resources in SL slot $y_1$ and SL slot $y_2$.

In some examples, multiple (e.g., two) re-transmission resources may be reserved in SL slot $y_1=y_0+T_1$ and $y_2=y_0+T_2$. An RX WTRU may (e.g., determine to) refrain from performing (e.g., not perform) a conflict detection for the reserved resources, for example, if $T_1<T_{proc}+T_{offset}$ and $T_2-T_1<T_{proc}+T_{offset}$.

An RX WTRU may determine conflict detection occasion(s) of resource(s) reserved in a received SCI for initial transmission and/or re-transmissions. An RX WTRU may receive a periodic resource reservation in an SCI in SL slot $y_0$, for example, if (e.g., when) the value of a resource reservation period (e.g., $P_{rsvp\_TX}$) indicated in the SCI is larger than zero. The (e.g., same) sub-channels reserved in SL slots $y_0$, $y_1$ and $y_2$ (e.g., if re-transmission resources are reserved) may be reserved (e.g., periodically) in SL slot $y_0+n*P_{rsvp\_TX}$, $y_1+n*P_{rsvp\_TX}$, and $y_2+n*P_{rsvp\_TX}$. The value of n may be from 1 to N. N may be a resource re-selection value, for example, that is indicated (e.g., (pre)configured by higher layers).

An RX WTRU may determine one or multiple (e.g., latest) conflict detection occasion(s) for resource(s) reserved for (e.g., initial) transmissions and/or re-transmissions in a received SCI in SL slot $y_0$, for example, based on one or more of the following: a conflict detection processing time (e.g., $T_{proc}$); a conflict indication transmission processing time (e.g., $T_{PSICH}$); one or more PSICH transmission occasions (pre)configured in a resource pool; a number of resources reserved in the received SCI; time gap (e.g., $T_1$) indicated in the received SCI for the resource reserved in SL slot $y_1=y_0+T_1$; a time gap (e.g., $T_2$) indicated in the received SCI for the resource reserved in SL slot $y_2=y_0+T_2$; and/or a resource reservation period $P_{rsvp\_TX}$.

An RX WTRU may determine (e.g., for a reservation period, for example, such as each reservation period) one or multiple (e.g., latest) conflict detection occasion(s) for resource(s) reserved for re-transmissions in a received SCI in SL slot $y_0$. One or more of the following may apply.

A (e.g., one) initial resource may be reserved (e.g., periodically) in SL slot $y_0+n*P_{rsvp\_TX}$, for example, where $P_{rsvp\_TX}>=T_{proc}+T_{offset}$. An RX WTRU may determine a (e.g., latest) conflict detection occasion in the SL slot $y_{trig\_n}=y_0+n*P_{rsvp\_TX}-T_{proc}-T_{offset}$ corresponding to the reserved initial transmission of a (e.g., new) SL TB in SL slot $y_0+n*P_{rsvp\_TX}$, for example, if the initial resource is reserved (e.g., periodically) in SL slot $y_0+n*P_{rsvp\_TX}$ and $P_{rsvp\_TX}>=T_{proc}+T_{offset}$.

A (e.g., one) initial resource may be reserved (e.g., periodically) in SL slot $y_0+n*P_{rsvp\_TX}$, for example, where $P_{rsvp\_TX}<T_{proc}+T_{offset}$. An RX WTRU may (e.g., determine to) refrain from performing (e.g., not perform) a conflict detection for the reserved resource, for example, if the initial resource is reserved (e.g., periodically) in SL slot $y_0+n*P_{rsvp\_TX}$ and $P_{rsvp\_TX}<T_{proc}+T_{offset}$.

A (e.g., one) initial transmission and a (e.g., one) re-transmission resource $(y_1=y_0+T_1)$ may be reserved in SL slot $y_0=y_0+n*P_{rsvp\_TX}$ and $y_1=y_1+n*P_{rsvp\_TX}$, for example, where $P_{rsvp\_TX}>=T_{proc}+T_{offset\_1}$ and $T_1>=T_{proc}+T_{offset\_2}$. An RX WTRU may determine multiple (e.g., two latest) conflict detection occasions, for example, if the (e.g., one) initial transmission and the (e.g., one) re-transmission resource $(y_1=y_0+T_1)$ is reserved (e.g., periodically) in SL slot $y_0=y_0+n*P_{rsvp\_TX}$ and $y_1=y_1+n*P_{rsvp\_TX}$ and both $P_{rsvp\_TX}>=T_{proc}+T_{offset\_1}$ and $T_1>=T_{proc}+T_{offset\_2}$. An RX WTRU may determine multiple (e.g., two) latest conflict detection occasions where one of the latest conflict detection occasions includes a conflict detection occasion in the SL slot $y_{trig\_n\_1}=y_0+n*P_{rsvp\_TX}-T_{proc}-T_{offset\_1}$ corresponding to the resource reserved in SL slot $y_0+n*P_{rsvp\_TX}$. An RX WTRU may determine multiple (e.g., two) latest conflict detection occasions where one of the latest conflict detection occasions includes a conflict detection occasion in the SL slot $y_{trig\_n\_2}=y_0+n*P_{rsvp\_TX}+T_1-T_{proc}-T_{offset\_2}$ corresponding to the resource reserved in SL slot $y_1+n*P_{rsvp\_TX}$.

A (e.g., one) initial transmission and a (e.g., one) re-transmission resource $(y_1=y_0+T_1)$ may be reserved in SL slot $y_0=y_0+n*P_{rsvp\_TX}$ and $y_1=y_1+n*P_{rsvp\_TX}$, for example, where $P_{rsvp\_TX}<T_{proc}+T_{offset\_1}$ and $T_1>=T_{proc}+T_{offset\_2}$. An RX WTRU may determine a (e.g., latest) conflict detection occasion in the SL slot $y_{trig}=y_0+n*P_{rsvp\_TX}+T_1-T_{proc}-T_{offset\_2}$ corresponding to the reserved re-transmission resource in SL slot $y_1+n*P_{rsvp\_TX}$, for example, if the (e.g., one) initial transmission and the (e.g., one) re-transmission resource $(y_1=y_0+T_1)$ is reserved (e.g., periodically) in SL slot $y_0=y_0+n*P_{rsvp\_TX}$ and $y_1=y_1+n*P_{rsvp\_TX}$ and both $P_{rsvp\_TX}<T_{proc}+T_{offset\_1}$ and $T_1>=T_{proc}+T_{offset\_2}$. An RX WTRU may refrain from performing (e.g., not perform) a conflict detection for the reserved re-transmission resource in SL slot $y_0+n*P_{rsvp\_TX}$.

A (e.g., one) initial transmission and a (e.g., one) re-transmission resource $(y_1=y_0+T_1)$ may be reserved in SL slot $y_0=y_0+n*P_{rsvp\_TX}$ and $y_1=y_1+n*P_{rsvp\_TX}$, for example, where $P_{rsvp\_TX}>=T_{proc}+T_{offset\_1}$ and $T_1<T_{proc}+T_{offset\_2}$. An RX WTRU may determine a latest conflict detection occasion in the SL slot $y_{trig}=y_0+n*P_{rsvp\_TX}-T_{proc}-T_{offset\_1}$ corresponding to the reserved re-transmission resource in both SL slot $y_0+n*P_{rsvp\_TX}$ and $y_1+n*P_{rsvp\_TX}$, for example, if the (e.g., one) initial transmission and the (e.g., one) re-transmission resource $(y_1=y_0+T_1)$ is reserved (e.g., periodically) in SL slot $y_0=y_0+n*P_{rsvp\_TX}$ and $y_1=y_1+n*P_{rsvp\_TX}$ and both $P_{rsvp\_TX}>=T_{proc}+T_{offset\_1}$ and $T_1<T_{proc}+T_{offset\_2}$. An RX WTRU may perform a conflict detection (e.g., at one conflict detection occasion) for the reserved re-transmission resources in both SL slots.

A (e.g., one) initial transmission and a (e.g., one) re-transmission resource $(y_1=y_0+T_1)$ may be reserved in SL slot $y_0=y_0+n*P_{rsvp\_TX}$ and $y_1=y_1+n*P_{rsvp\_TX}$, for example, where $P_{rsvp\_TX}<T_{proc}+T_{offset\_1}$ and $T_1<T_{proc}+T_{offset\_2}$. An RX WTRU may (e.g., determine to) refrain from performing (e.g., not perform) a conflict detection for (e.g., either of) the reserved resources, for example, if the (e.g., one) initial transmission and the (e.g., one) re-transmission resource $(y_1=y_0+T_1)$ is reserved (e.g., periodically) in SL slot $y_0=y_0+n*P_{rsvp\_TX}$ and $y_1=y_1+n*P_{rsvp\_TX}$ and $P_{rsvp\_TX}<T_{proc}+T_{offset\_1}$ and $T_1<T_{proc}+T_{offset\_2}$.

An RX WTRU may refrain from considering (e.g., not consider) the time gap between the initial and re-transmission $(T_1)$, for example, if/when determining the (e.g., latest) conflict detection triggering occasion for such a semi-persistent resource reservation (e.g., if the (e.g., one) initial transmission and the (e.g., one) re-transmission resource $(y_1=y_0+T_1)$ is reserved (e.g., periodically) in SL slot $y_0=y_0+n*P_{rsvp\_TX}$). An RX WTRU may determine a (e.g., latest) conflict detection occasion in the SL slot $y_{trig\_n}=y_0+n*P_{rsvp\_TX}-T_{proc}-T_{offset}$ which may correspond to the (e.g., two) resources reserved for an initial transmission of an (e.g., new) SL TB in SL slot $y_0+n*P_{rsvp\_TX}$ and its re-transmission in SL slot $y_1=y_1+n*P_{rsvp\_TX}$, for example, if $P_{rsvp\_TX}>=T_{proc}+T_{offset}$.

If an (e.g., one) initial transmission and multiple (e.g., two) re-transmission resources $(y_1=y_0+T_1$ and $y_2=y_0+T_2)$ are reserved (e.g., periodically) in SL slot $y_0=y_0+n*P_{rsvp\_TX}$, $y_1=y_1+n*P_{rsvp\_TX}$ and $y_2=y_2+n*P_{rsvp\_TX}$ and if $P_{rsvp\_TX}>=T_{proc}+T_{offset\_1}$ and $T_1>=T_{proc}+T_{offset\_2}$ and $T_2>=T_{proc}+T_{offset\_3}$, an RX WTRU may determine multiple (e.g., three) latest conflict detection occasions. In examples, the RX WTRU may determine a (e.g., one of the multiple) latest conflict detection occasion in the SL slot $y_{trig\_n\_1}=y_0+$ $n*P_{rsvp\_TX} - T_{proc} - T_{offset\_1}$, which may correspond to the resource reserved in SL slot $y_0 + n*P_{rsvp\_TX}$. The RX WTRU may determine a (e.g., one of the multiple) latest conflict detection occasion in the SL slot $y_{trig\_n\_2} = y_0 + n*P_{rsvp\_TX} + T_1 - T_{proc} - T_{offset\_2}$, which may correspond to the resource reserved in SL slot $y_1 + n*P_{rsvp\_TX}$. The RX WTRU may determine a (e.g., one of the multiple) latest conflict detection occasion in the SL slot $y_{trig\_n\_3} = y_0 + n*P_{rsvp\_TX} + T_2 - T_{proc} - T_{offset\_3}$ corresponding to the resource reserved in SL slot $y_1 + n*P_{rsvp\_TX}$.

If an (e.g., one) initial transmission and two re-transmission resources ($y_1 = y_0 + T_1$ and $y_2 = y_0 + T_2$) are reserved (e.g., periodically) in SL slot $y_0 = y_0 + n*P_{rsvp\_TX}$, $y_1 = y_1 + n*P_{rsvp\_TX}$ and $y_2 = y_2 + n*P_{rsvp\_TX}$, and if $P_{rsvp\_TX} < T_{proc} + T_{offset\_1}$ and $T_1 < T_{proc} + T_{offset\_2}$ and $T_2 < T_{proc} + T_{offset\_3}$, an RX WTRU may determine to refrain from performing (e.g., not to perform) a conflict detection for (e.g., either of) the reserved resources.

An RX WTRU may refrain from considering (e.g., not consider) the time gaps between the initial and re-transmissions (e.g., $T_1$, $T_2$), for example, if (e.g., when) determining the latest conflict detection triggering occasion for (e.g., such) a (e.g., semi-persistent) resource reservation (e.g., if an (e.g., one) initial transmission and two re-transmission resources ($y_1 = y_0 + T_1$ and $y_2 = y_0 + T_2$) are reserved (e.g., periodically) in SL slot $y_0 = y_0 + n*P_{rsvp\_TX}$, $y_1 = y_1 + n*P_{rsvp\_TX}$ and $y_2 = y_2 + n*P_{rsvp\_TX}$). If $P_{rsvp\_TX} >= T_{proc} + T_{offset}$ (e.g., and the initial transmission and two re-transmission resources are reserved as described herein), an RX WTRU may determine a latest conflict detection occasion in the SL slot $y_{trig\_n} = y_0 + n*P_{rsvp\_TX} - T_{proc} - T_{offset}$, which may correspond to the multiple (e.g., three) resources reserved for the initial transmission of an (e.g., new) SL TB in SL slot $y_0 + n*P_{rsvp\_TX}$ and its re-transmission in SL slot $y_1 = y_1 + n*P_{rsvp\_TX}$ and SL slot $y_2 = y_2 + n*P_{rsvp\_TX}$.

An RX WTRU may (e.g., determine to) trigger a conflict detection at a (e.g., determined) conflict detection triggering occasion. An RX WTRU may (e.g., determine to) trigger a conflict detection in an SL slot (e.g., slot n), for example, before a determined (e.g., latest) conflict detection triggering occasion (e.g., corresponding to a resource reserved in an SCI received in SL slot $y_0$). A determination to trigger a conflict detection may be based on, for example, one or more of the following: a subset of WTRU source and/or destination IDs; an SL priority threshold (e.g., $Prio_{thre}$); an SL CBR threshold (e.g., $CBR_{thre}$); an enabled/disabled indication for inter-WTRU coordination and/or conflict detection (e.g., ConflictDetEnabled); PSICH/PSFCH resource configuration information; an SL RSRP of a PSCCH carrying the SCI in SL slot y_0; a distance between the RX WTRU and TX WTRU using a zone ID and a minimum communication requirement (MCR) indicated in the SCI received in SL slot y_0 (e.g., specific to the SL TB to be transmitted in the reserved resource); an SL power saving state indication (e.g., indicated in the SCI received in SL slot y_0); a resource allocation scheme (e.g., indicated in the SCI received in SL slot y_0); a WTRU type indication (e.g., indicated in the SCI received in SL slot y_0); a decoding status and/or HARQ feedback status of PSSCH transmissions in resource(s) reserved in the SCI received in SL slot y_0; and/or an (e.g., explicit) request from a TX WTRU for inter-WTRU coordination and/or conflict detection.

In some examples, an RX WTRU may receive configuration information indicating (e.g., be (pre)configure, e.g., by higher layers with), for example, a subset of WTRU source/destination IDs for an SL resource conflict and indication. An RX WTRU may receive a resource reservation in an SCI of a PSSCH/PSCCH transmission. An RX WTRU may (e.g., determine to) trigger a conflict detection, for example, if (e.g., when) the WTRU source and/or destination ID indicated in the received SCI is/are within the indicated (e.g., (pre)configured) sub-set.

In some examples, an RX WTRU may receive configuration information indicating (e.g., be (pre)configured with) an SL priority threshold (e.g., $Prio_{thre}$) in an SL resource pool. An RX WTRU may receive a resource reservation in an SCI of a PSSCH/PSCCH transmission. An RX WTRU may (e.g., determine to) trigger a conflict detection, for example, if (e.g., when) the priority indicated in the received SCI is higher than the (pre)configured SL priority threshold.

A WTRU may receive configuration information indicating (e.g., be (pre)configured with) an SL CBR threshold (e.g., $CBR_{thre}$) in an SL resource pool. An RX WTRU may receive a resource reservation in an SCI of a PSSCH/PSCCH transmission. An RX WTRU may (e.g., determine to) trigger a conflict detection, for example, if (e.g., when) a CBR measured at a resource conflict detection triggering occasion is below the (pre)configured SL CBR threshold.

In some examples, a WTRU may receive configuration information indicating (e.g., be (pre)configured with) an enabled/disabled indication for conflict detection (e.g., ConflictDetEnabled). An RX WTRU may receive a resource reservation in an SCI of a PSSCH/PSCCH transmission. An RX WTRU may (e.g., determine to) trigger a conflict detection, for example, if (e.g., when) the indication of ConflictDetEnabled in the received SCI is set as "enabled."

An RX WTRU may receive configuration information (e.g., be (pre)configured with) a resource pool (e.g., including PSICH/PSFCH resources). The presence of PSICH/PSFCH resources in the (pre)configured resource pool may indicate an inter-WTRU coordination and/or that a conflict detection may be enabled on transmissions using resources of the resource pool. An RX WTRU may determine to trigger a conflict detection for a reserved resource, for example, if (e.g., when) the reserved resource is included in a resource pool (e.g., with a PSICH/PSFCH resource configuration).

An RX WTRU may determine to trigger a conflict detection for a reserved resource, for example, if (e.g., when) a measured SL RSRP of the PSCCH carrying the SCI reserving the resource in SL slot y_0 exceeds a (pre)configured SL RSRP threshold. In examples, a WTRU may receive configuration information indicating (e.g., be (pre)configured with) a set of SL RSRP threshold values and a (e.g., each) SL RSRP threshold (e.g., from the set of SL RSRP threshold values) may be associated with an SL priority. An RX WTRU may determine an SL RSRP threshold corresponding to the L1 priority value indicated in the SCI reserving the resource for a conflict detection.

In examples, an RX WTRU may determine to trigger a conflict detection for a reserved resource, for example, if (e.g., when) the TX-RX distance does not exceed the MCR indicated in the SCI reserving the resource for the conflict detection. In examples, WTRU source and/or destination ID indicated in the SCI transmitted by the TX WTRU may be associated with the V2X service and/or SL applications subscribed by the RX WTRU. An RX WTRU may determine a TX WTRU's geographic location (e.g., as the center of a geographic zone) indicated by the received TX WTRU's zone ID and may compute a TX-RX distance, for example, based on the TX WTRU's and RX WTRU's geographic locations.

An RX WTRU may (e.g., determine to) refrain from triggering (e.g., not trigger) a conflict detection for a reserved resource, for example, if (e.g., when) a SL power saving state indication (e.g., included in the SCI reserving the resource) indicates a state of reduced power consumption. For example, a TX WTRU may be in a power saving state in which sensing and/or reception is limited or disabled. A TX WTRU may disable resource re-selection in a power saving state, for example, to reduce power consumption. A TX WTRU may indicate such a power saving state in a resource reservation included in a SCI, and an RX WTRU may (e.g., determine to) refrain from triggering (e.g., not trigger) a conflict detection for such a SL transmission.

In examples, an RX WTRU may (e.g., determine to) refrain from triggering (e.g., not trigger) a conflict detection for a reserved resource, for example, if (e.g., when) a random and/or partial resource selection scheme is indicated in the SCI reserving the resource. In examples, a TX WTRU may (e.g., randomly) select a resource for a SL transmission, for example, without performing sensing. This may be due to power saving and/or an HW limitation, e.g., a TX-only WTRU without RX HW. In examples, a TX WTRU may perform partial sensing for a SL transmission and an RX WTRU may (e.g., be (pre)configured to) refrain from triggering (e.g., not trigger) a conflict detection on such transmission.

In examples, an RX WTRU may (e.g., determine to) refrain from (e.g., not trigger) a conflict detection for a reserved resource, for example, if (e.g., when) a (e.g., (pre)configured) WTRU type is indicated in in the SCI reserving the resource. Such (e.g., (pre)configured) WTRU type may include a vulnerable roader user (VRU), low power wearable device, and/or WTRU with limited HW capability. An RX WTRU may (e.g., be (pre)configured to) refrain from triggering (e.g., not trigger) a conflict detection for a SL transmission performed by such type of WTRU.

An RX WTRU may (e.g., determine to) trigger a conflict detection for a reserved resource, for example, based on the decoding status and/or HARQ feedback status (e.g., if/when HARQ is enabled) of PSSCH transmissions received in resource(s) reserved in the SCI received in SL slot $y_0$. An RX WTRU may receive configuration information indicating (e.g., be (pre)configured with) a threshold of decoding CRC errors and/or HARQ NACKs. An RX WTRU may (e.g., determine to) trigger a conflict detection, for example, if (e.g., when) the decoding CRC errors and/or HARQ NACKs corresponding to PSSCH transmissions received in the resource(s) reserved in the SCI received in in SL slot $y_0$ exceeds the (pre)configured threshold. In examples, the RX WTRU may receive the PSSCH transmissions in (e.g., semi-persistently) reserved resources in SL slot $y_0 + n*P_{rsvp\_TX}$, $y_1 + n*P_{rsvp\_TX}$, and $y_2 + n*P_{rsvp\_TX}$, for example, where n may be from 1 to N and N may be a resource re-selection value (e.g., indicated and/or (pre)configured, for example, by higher layers).

In examples, an RX WTRU may (e.g., determine to) trigger an inter-WTRU coordination and/or conflict detection, for example, if (e.g., when) the RX WTRU receives a (e.g., explicit) request from a TX WTRU. The (e.g., explicit) request may include a WTRU source and/or destination ID associated with the V2X services and/or SL applications (e.g., subscribed to by the RX WTRU). An RX WTRU may (e.g., determine to) trigger an inter-WTRU coordination and/or conflict detection for received resource reservations (e.g., based on receiving the request), for example, including the WTRU source and/or destination ID indicated in the (e.g., explicit) request.

Figure 3:
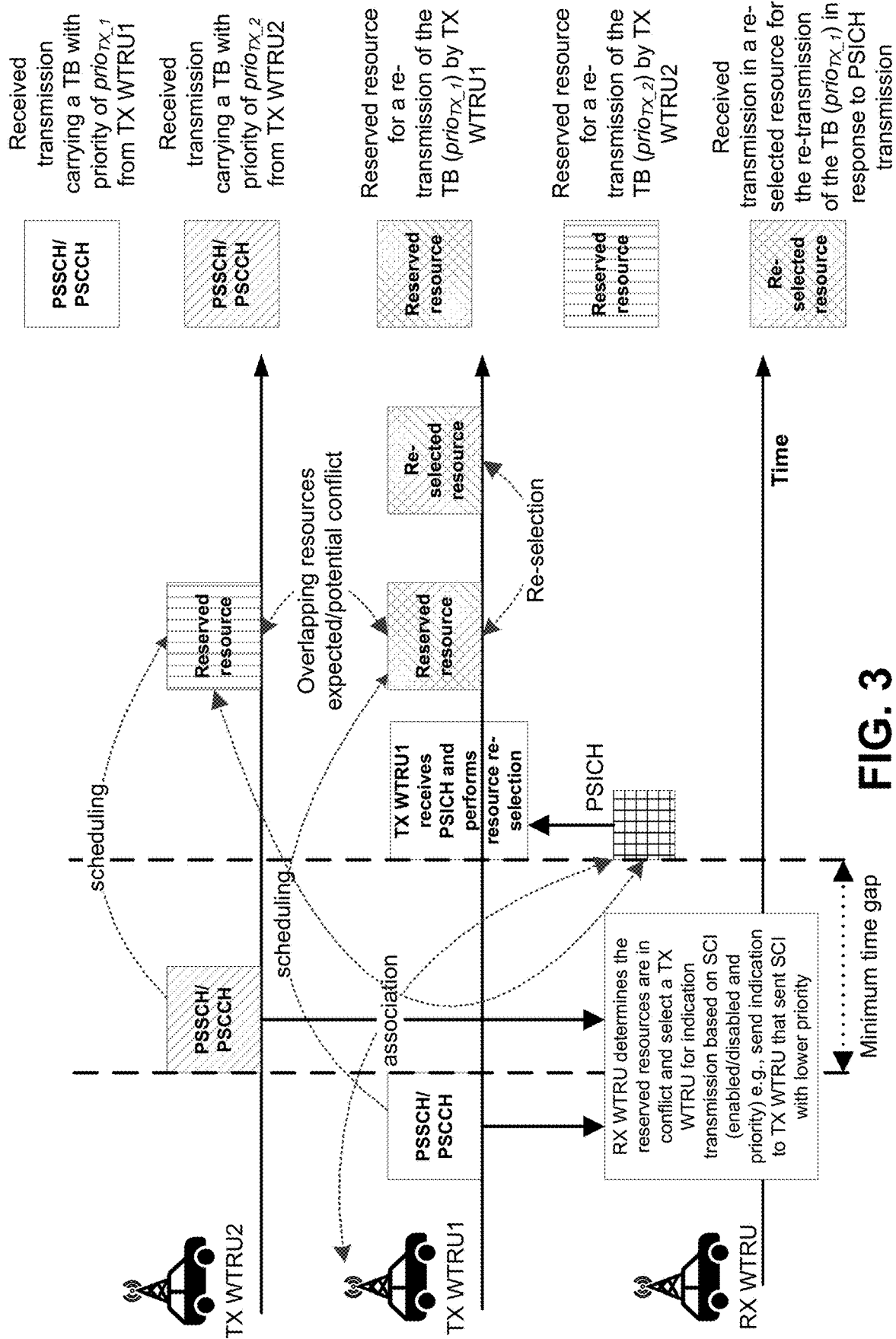
FIG. 3 illustrates an example of a RX WTRU performing conflict detection and conflict indication.

FIG. 3 illustrates an example of a RX WTRU performing conflict detection and conflict indication.

An RX WTRU may detect a conflict based on (e.g., upon) a trigger (e.g., determining a condition is satisfied). An RX WTRU may determine a conflict, for example, due to detected overlapping resource reservations (e.g., as shown in FIG. 3). An RX WTRU may determine that conflict detection in SL slot n has been triggered (e.g., a condition has been satisfied). An RX WTRU may (e.g., based on the triggering of conflict detection in SL slot n) process decoded SCI and/or RSRP measurements in a set of determined sub-channels and/or SL slots, for example, to determine whether a conflict is detected in reserved resources for the conflict detection. An SL conflict detection may include, for example, one or more of the following (e.g., performed by an RX WTRU): determining one or more conflict detection parameters; performing SCI decoding; determining an overlapping of reserved resources; determining a conflict detection based on an overlapping reservation; and/or determining the type of a detected conflict.

An RX WTRU may determine one or more conflict detection parameters. One or more (e.g., conflict detection) parameters may be indicated in received configuration information (e.g., (pre)configured, e.g., by higher layers)), such as one or more of the following parameters: an SL conflict detection RSRP threshold (e.g., $RSRP_{conflict}$); a conflict detection window (e.g., $T_{window}$, such as 1000 SL slots); a demodulation reference signal (DM-RS) for the measurement (e.g., PSCCH DM-RS or PSCCH DM-RS); and/or a set of resource reservation periods (e.g., $P'_{rsvp\_TX}$, such as 10 SL slots, 20 SL slots, etc.). One or more (e.g., conflict detection) parameters may be indicated in an SCI reserving for the resource(s) in an SL slot (e.g., SL slot y) for conflict detection (e.g., from a reserving TX WTRU), for example, such as one or more of the following parameters: an L1 priority (e.g., $prio_{TX\_1}$), for example, indicated in a received SCI and/or associated with the WTRU source and/or destination ID (pre)configured for the RX WTRU (e.g., as a result of the V2X service and/or applications supported by the RX WTRU); a reserved number of sub-channel (e.g., $L_{subCH}$); and/or a resource reservation period (e.g., $P_{rsvp\_TX\_1}$).

A RX WTRU may perform SCI decoding in (e.g., all) sub-channels of a resource pool in an (e.g., each) SL slot within the conflict detection window, e.g., from SL slot $(n-T_{window})$ to SL slot (n).

An RX WTRU may determine an overlapping of reserved resources, for example, if (e.g., when) an SCI decoded in an SL slot includes a reservation of sub-channels overlapping partially or fully with $L_{subCH}$ in slot (y). An SL slot may be, for example, a (e.g., any) SL slot within the range from SL slot (y−32) to SL slot (y). An SL slot may include an SCI transmission reserving a resource for re-transmission that may overlap with the reserved resource in SL slot (y). An SL slot may be, for example, a (e.g., any) SL slot that is $q*P'_{rsvp\_TX}$ slots before SL slot (y). In some examples, $P'_{rsvp\_TX}$ may be a (e.g., any) (pre)configured resource reservation period and/or q may be a non-zero positive integer. The SL slots may include an SCI transmission reserving periodical resource(s), which may overlap with the reserved resource in SL slot (y).

An RX WTRU may determine a conflict detection, for example, based on an overlapping reservation decoded in an SCI and/or an RSRP measured over a (e.g., (pre)configured) DM-RS (e.g., PSCCH or PSSCH DM-RS) associated with the decoded SCI. An RX WTRU may determine a conflict is detected, for example, if (e.g., when) the measured RSRP is higher than an indicated (e.g., (pre)configured SL) conflict detection RSRP threshold (e.g., $RSRP_{conflict}$). An $RSRP_{conflict}$ may be computed, for example, based on L1 priorities indicated in multiple (e.g., both) SCIs reserving the overlapping resources (e.g., prio$_{TX\_1}$ and prio$_{TX\_2}$).

An RX WTRU may determine the type of a detected conflict (e.g., one-time or periodic conflict) based on, for example, one or more of the following: a resource reservation period (e.g., P$_{rsvp\_TX\_1}$), which may be indicated in the SCI (e.g., by the reserving TX WTRU); and/or a resource reservation period (e.g., P$_{rsvp\_TX\_2}$), which may be indicated in the SCI (e.g., including the overlapping resource reservation), for example, by the conflicting TX WTRU.

In some examples, P$_{rsvp\_TX\_2}$=0 and/or P$_{rsvp\_TX\_1}$=0. An RX WTRU may determine that the detected conflict may be a result of an aperiodic transmission (e.g., and may occur once), where the detected conflict may be a one-time conflict (e.g., if P$_{rsvp\_TX\_2}$=0 and/or P$_{rsvp\_TX\_1}$=0). In some examples, both P$_{rsvp\_TX\_1}$ and P$_{rsvp\_TX\_2}$>0 and P$_{rsvp\_TX\_1}$=m*P$_{rsvp\_TX\_2}$ or P$_{rsvp\_TX\_2}$=m*P$_{rsvp\_TX\_1}$ (e.g., where m is a non-zero positive integer). An RX WTRU may determine that the detected conflict may be a result of a periodical transmission (e.g., and may occur periodically), where the detected conflict may be a periodic conflict, for example, if P$_{rsvp\_TX\_1}$ and P$_{rsvp\_TX\_2}$>0 and P$_{rsvp\_TX\_1}$=m*P$_{rsvp\_TX\_2}$ or P$_{rsvp\_TX\_2}$=m*P$_{rsvp\_TX\_1}$. The periodic conflict may result in persistent collision between periodic transmissions.

Figure 2A:
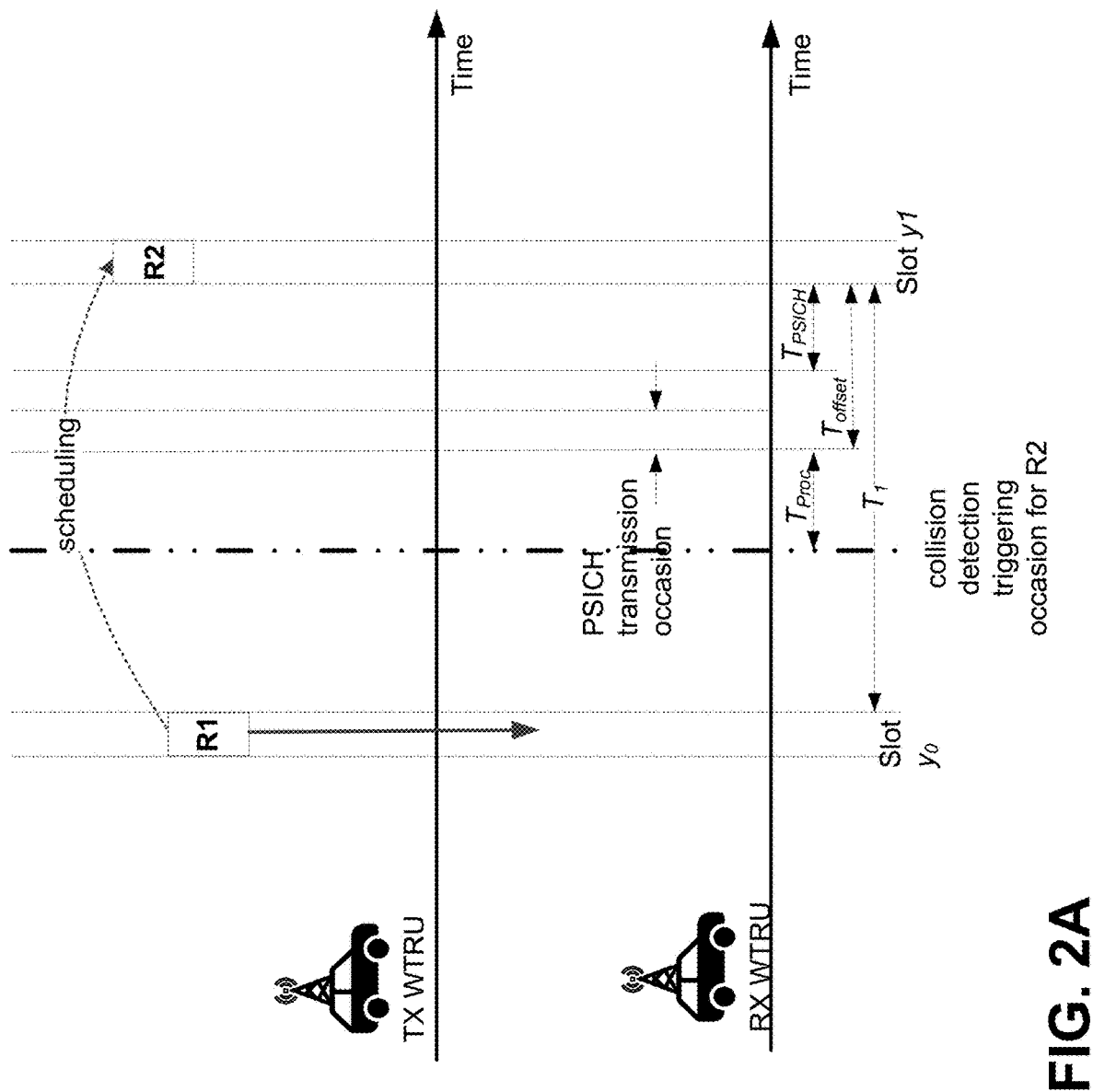
FIGS. 2A-2D illustrate examples of WTRU collision detection triggering occasions for re-transmission resource(s) reservation.
Figure 2B:
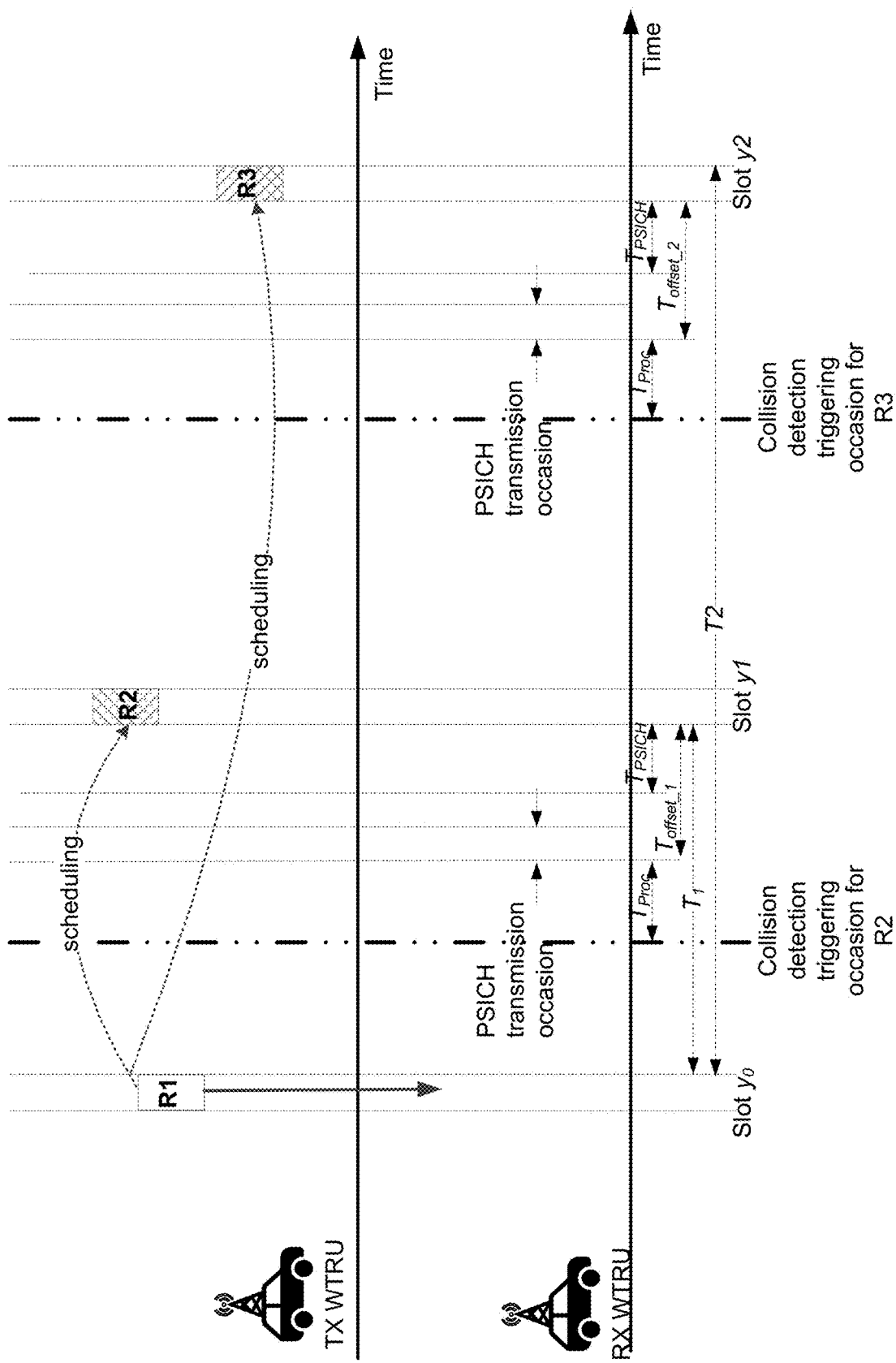
Figure 2C:
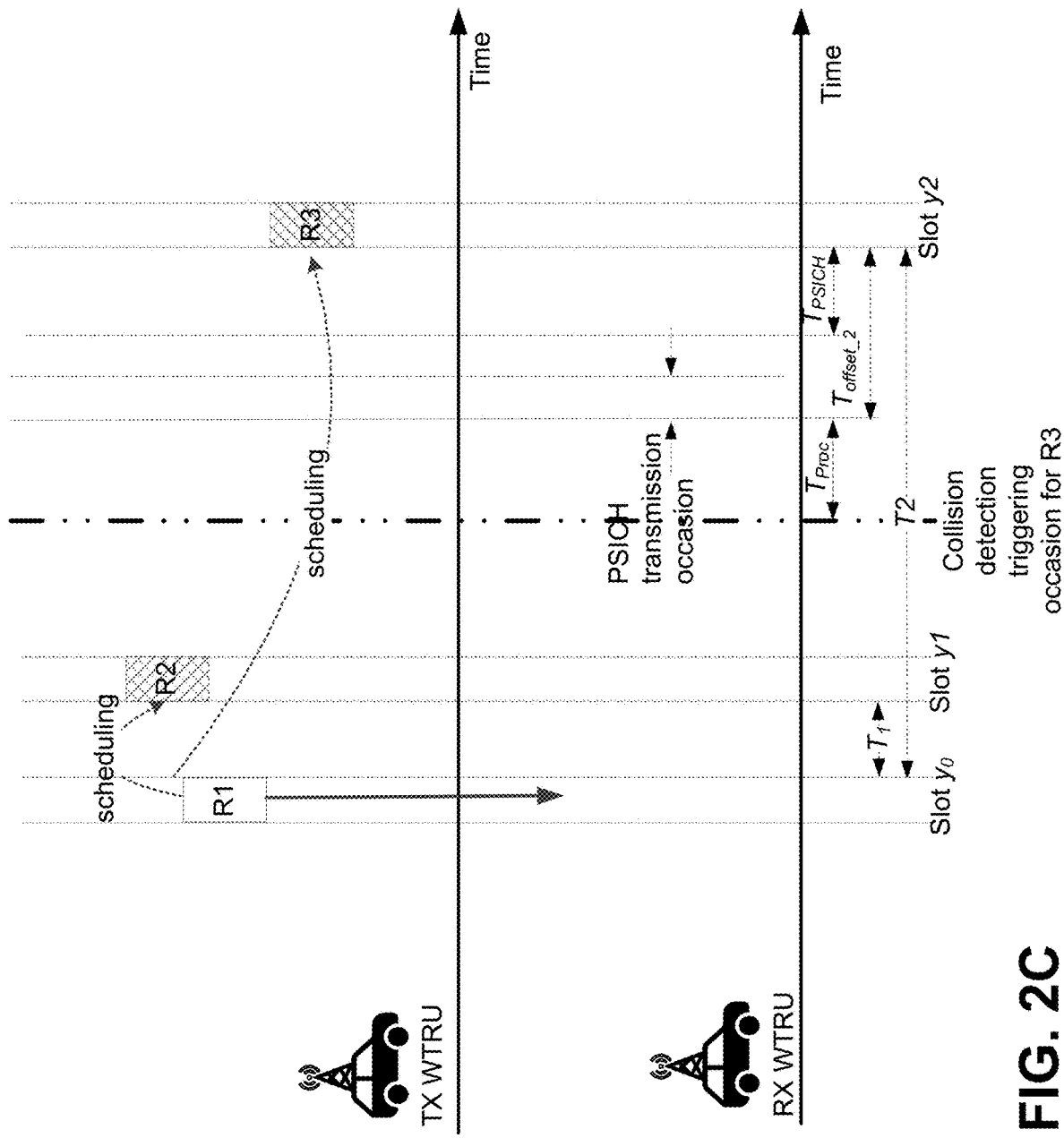
Figure 2D:
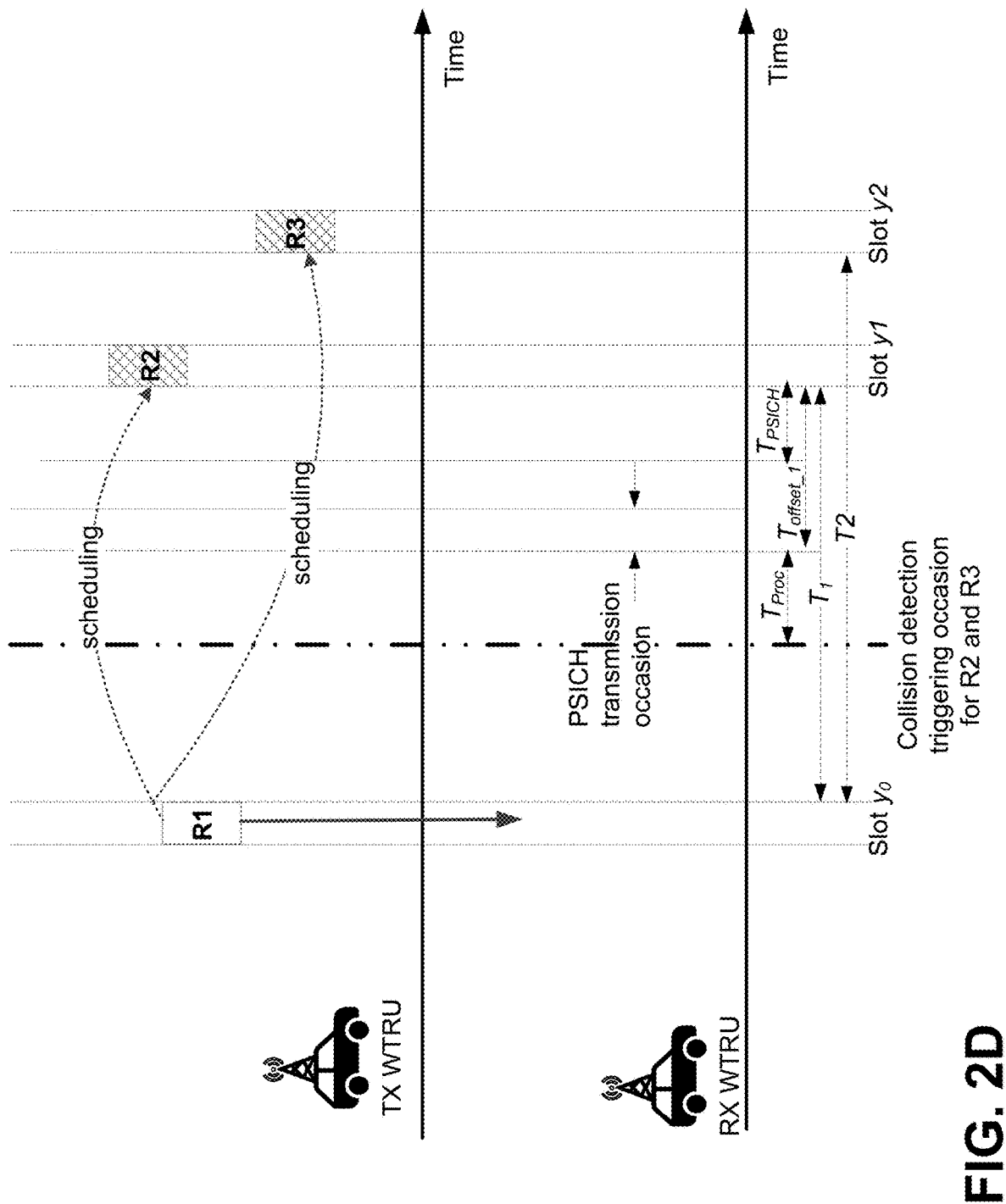

An RX WTRU may perform a conflict detection (e.g., as described herein) for a (e.g., each) reserved resource that may be included in a triggered conflict detection, for example, if (e.g., when) there are multiple resources (e.g., as shown by example in FIG. 2D).

An RX WTRU may determine a same-slot conflict, for example, due to overlapping resource reservations. In examples, an RX WTRU may perform a conflict detection for the resource reserved in the same slot (e.g., SL slot y$_0$) in which the SCI reserving the resources may be received. The conflict detection may be based on the parameters indicated in the (e.g., each) decoded resource reservation received in the SL slot y$_0$. The parameters may include a WTRU source and/or a destination ID, and/or the reserved number of sub-channel (L$_{subCH}$).

An RX WTRU may determine a conflict is detected in in SL slot y$_0$, for example, if (e.g., when) both of the following occur: SCIs decoded from multiple (e.g., two or more) PSCCHs in SL slot y$_0$ indicate reservations overlapping (e.g., at least) over a (e.g., one) sub-channel reserved for PSSCH transmissions in the same SL slot; and the WTRU source and/or destination IDs indicated in the overlapping resource reservation are associated with V2X service and/or SL applications subscribed to by the RX WTRU.

In examples, an RX WTRU may determine a conflict is detected in SL slot y$_0$, for example, if (e.g., when) both of the following occur: SCIs decoded from multiple (e.g., two or more) PSCCHs in SL slot y$_0$ indicate an identical WTRU source and/or destination IDs specific to a groupcast transmissions; and the WTRU source and/or destination IDs indicated in reservations is associated with V2X service and/or SL applications subscribed to by the RX WTRU.

An RX WTRU may determine a conflict due to previously received resource reservations. In examples, a WTRU may determine a conflict detection based on previously received semi-persistent resource reservation(s) and the resource reservation that triggers the conflict detection (e.g., based on a triggering of a conflict detection in SL slot n). A WTRU may perform one or more of the following associated with conflict detection.

An RX WTRU may determine conflict detection parameters, for example, such as one or more of the following conflict detection parameters: parameters indicated in the SCI reserving for the resource(s) in the SL slot (e.g., SL slot y) for conflict detection (e.g., from a reserving TX WTRU); and/or parameters indicated in the SCI(s) received previously in a semi-persistent resource reservation from another TX WTRU(s).

Parameters indicated in the SCI reserving for the resource(s) in the SL slot (e.g., SL slot y) for conflict detection (e.g., from a reserving TX WTRU) may include the reserved number of sub-channel (L$_{subCH\_1}$), a resource reservation period (P$_{rsvp\_TX\_1}$), and/or a TCI state of transmission in the reserved resource (TCI$_1$).

An RX WTRU may determine conflict detection parameters, for example, such as parameters indicated in the SCI(s) received previously in a semi-persistent resource reservation from another TX WTRU(s). The WTRU source and/or destination ID indicated in such SCI(s) may be among the IDs (e.g., (pre)configured) to be received by the RX WTRU. The parameters indicated in the SCI(s) received (e.g., previously in a semi-persistent resource reservation from another TX WTRU(s)) may include the reserved number of sub-channel(s) (L$_{subCH\_2}$), the reserved SL slot(s), a resource reservation period (e.g., P$_{rsvp\_TX\_2}$) and P$_{rsvp\_TX\_2}$>0, and/or a TCI state of transmission in the reserved resource (TCI$_2$).

An RX WTRU may determine a conflict is detected, for example, if (e.g., when) there is a previously received resource reservation in slot (y) (e.g., the SL slot(s) reserved by another TX WTRUs may overlap with slot (y)) and one or more of the following conditions is present: the reserved sub-channels overlap (e.g., partially or fully) with L$_{subCH}$ in slot (y); or the reception spatial domain filter associated with TCI$_1$ and TCI$_2$ is spatially orthogonal (e.g., the RX WTRU cannot receive both of them using one RX beam).

An RX WTRU may determine the type of a detected conflict (e.g., one-time or periodic conflict), for example, based on a first resource reservation period (e.g., P$_{rsvp\_TX\_1}$) indicated in the SCI by the reserving TX WTRU, and/or a second resource reservation period (e.g., P$_{rsvp\_TX\_2}$) indicated in the SCI including the overlapping resource reservation by the conflicting TX WTRU. In examples, an RX WTRU may determine the detected conflict is a result of a periodical transmission and may occur periodically and the detected conflict may be a periodic conflict, for example, if (e.g., when) P$_{rsvp\_TX\_1}$ and P$_{rsvp\_TX\_1}$=m*P$_{rsvp\_TX\_2}$ or P$_{rsvp\_TX\_2}$=m*P$_{rsvp\_TX\_1}$ (e.g., where m is a non-zero positive integer). The periodic conflict may result in persistent collision between periodic transmissions.

In examples, an RX WTRU may determine a detected conflict is a periodical conflict, for example, if (e.g., when) m is below a (pre)configured threshold. The reserved resources may overlap in each reservation period, for example, if (e.g., when) m is equal to one. The reserved resources may overlap every two reservation periods, for example, if (e.g., when) m is equal to two.

An RX WTRU may determine a conflict, for example, based on (e.g., due to) its scheduled SL or UL transmissions. In examples, an RX WTRU may determine a conflict is detected if (e.g., when) one of the following transmissions by the RX WTRU is previously reserved in slot (y) and the WTRU source and/or destination ID indicated in the SCI reserving the resource in slot (y) is associated the V2X service and/or SL applications subscribed by the RX WTRU: an SL transmission scheduled in slot (y) by a network (e.g., gNB) based on SL Mode 1 resource allocation, an SL transmission reserved in slot (y) by the RX WTRU based on SL Mode 2 resource allocation, and/or an UL transmission scheduled in slot (y) by the network (e.g., gNB). An RX WTRU may refrain from (e.g., not be able to) receive in a slot in which it transmits (e.g., due to a half duplex limitation of the SL operation).

A WTRU may transmit a resource conflict indication (e.g., in a PSICH transmission, for example, as shown in FIG. 3). An RX WTRU may determine a TX WTRU and/or corresponding information for a PSICH transmission. An RX WTRU may determine a TX WTRU to transmit a PSICH transmission to, for example, if (e.g., when) a conflict detection is triggered for a conflict detection triggering occasion and a conflict is detected (e.g., as shown in FIG. 3). The conflict detection triggering occasion may include a time window where the RX WTRU has sufficient time to detect a conflict and send a conflict indication, for example, to the TX WTRU. The resource in which a conflict is detected at the corresponding conflict detection triggering occasion may be referred to as a resource in conflict. A determination (e.g., of a TX WTRU to transmit a PSICH transmission to) may be based on, for example, one or more of the following: one or more L1 priorities indicated in the SCIs reserving the overlapping resources (e.g., $prio_{TX\_1}$ and $prio_{TX\_2}$); an enabled/disabled indication for inter-WTRU coordination and/or conflict detection (e.g., ConflictDetEnabled); an enabled/disabled indication for inter-WTRU coordination and/or conflict indication (e.g., ConflictIndEnabled); an SL CBR threshold (e.g., $CBR_{thre}$); a decoding result of a PSSCH transmission associated with the SCI reserving the resources; a type of the detected conflict (e.g., one-time or periodic); a WTRU source and/or destination IDs indicated in the SCIs reserving the resources in conflict; an SL power saving indication indicated in the SCIs reserving the resources in conflict; a WTRU type indication indicated in the SCIs reserving the resources in conflict; a resource allocation scheme indicated in the SCIs reserving the resources in conflict; SL RSRPs of PSCCH transmissions carrying the SCIs reserving the resources in conflict; and/or a distance between the RX WTRU and TX WTRUs reserving the resources in conflict.

Figure 4A:
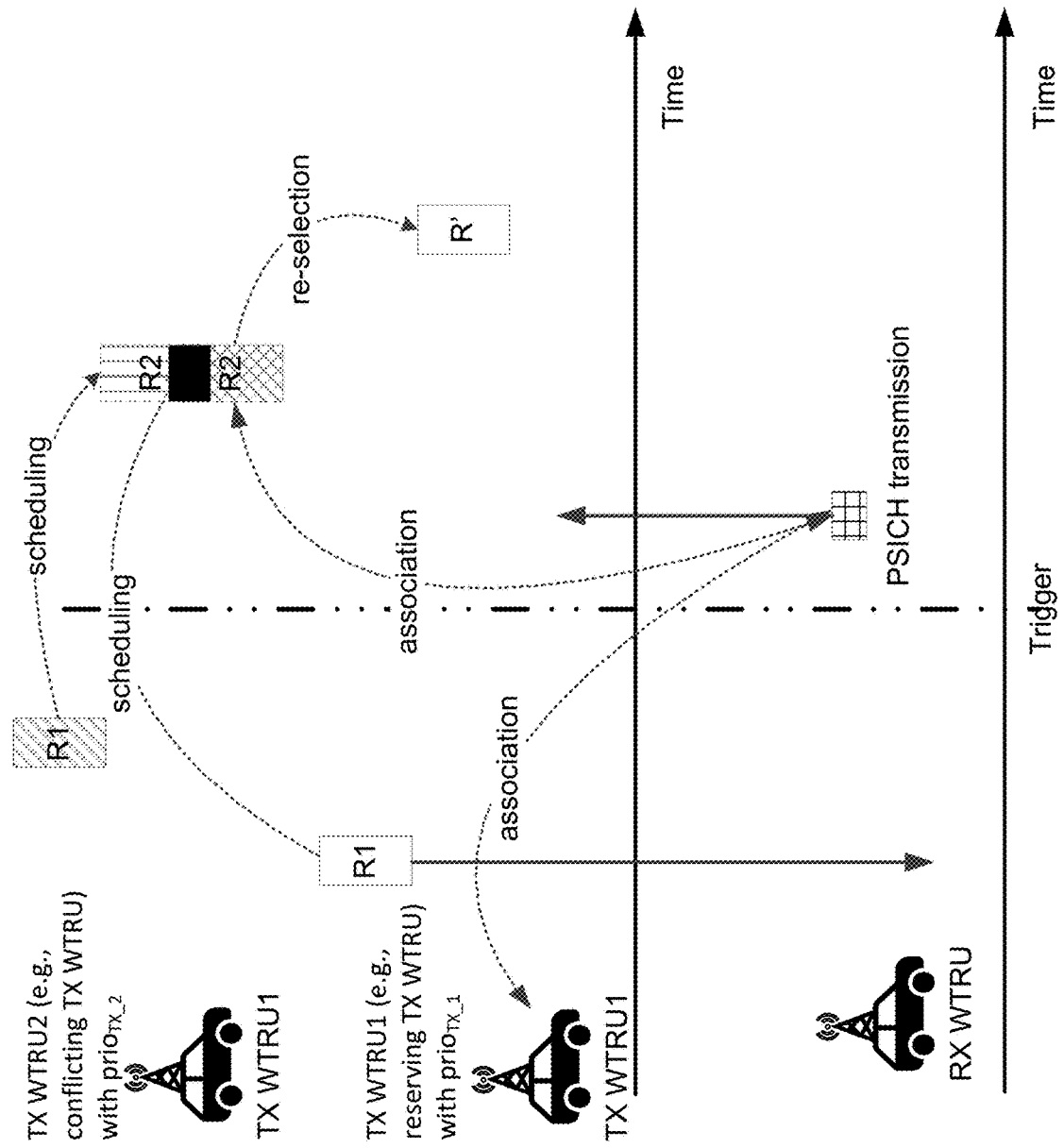
FIGS. 4A-C illustrate examples of PSICH transmissions.
Figure 4B:
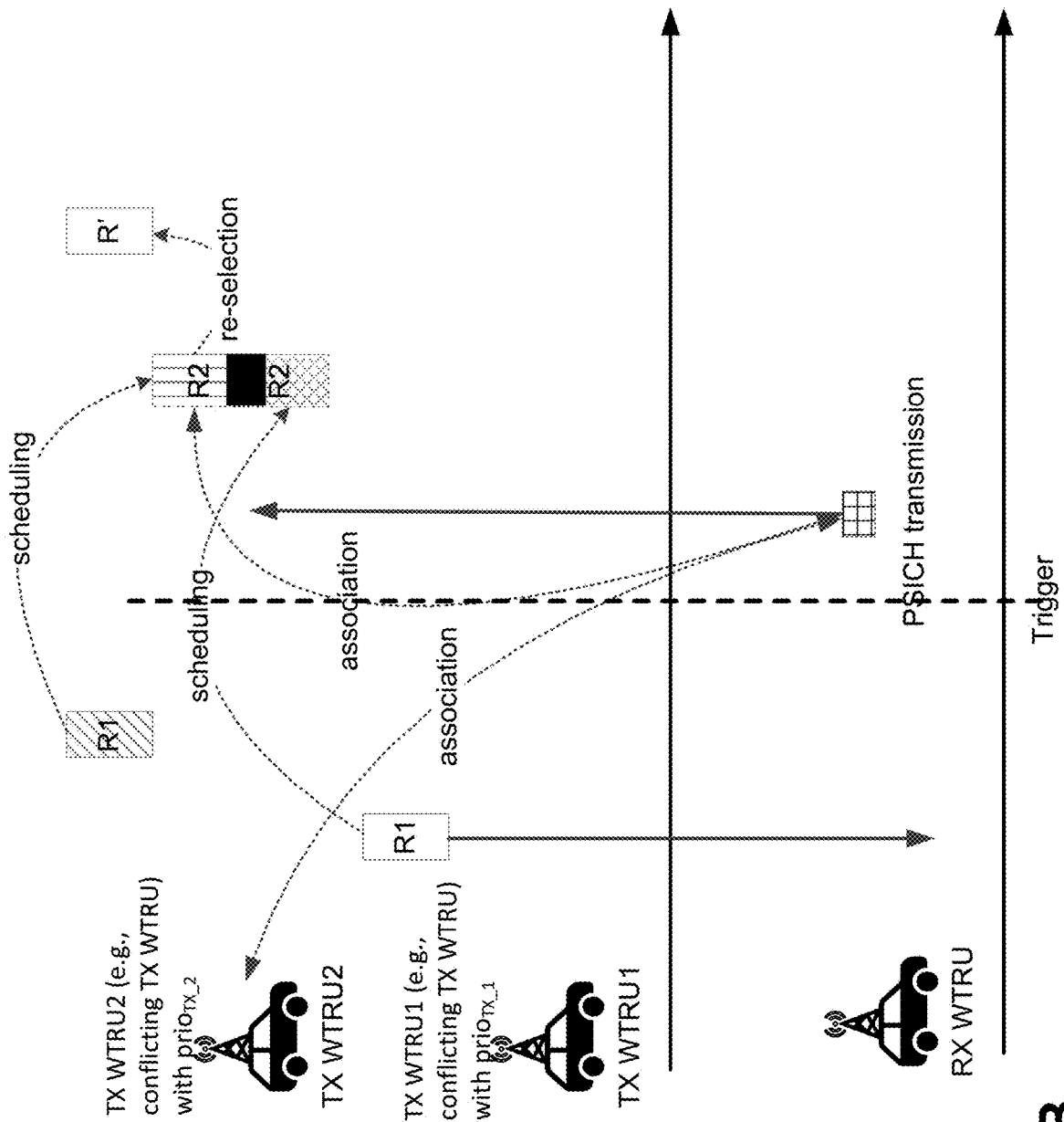

An RX WTRU may determine a TX WTRU and/or corresponding information for a PSICH transmission, for example, based on an L1 priority indication in an SCI (e.g., carried in a PSCCH transmission, for example, as shown in FIG. 3). An RX WTRU may determine which TX WTRU to transmit a PSICH transmission to, for example, based on an L1 priority indicated in a received SCI reserving the resource(s) (e.g., $prio_{TX\_1}$) and/or based on an L1 priority indicated in a decoded SCI including the overlapping resource reservation (e.g., $prio_{TX\_2}$). An RX WTRU may (e.g., determine to) transmit a PSICH transmission to the TX WTRU with a lower priority, for example a lower L1 priority (e.g., as shown in FIG. 3). An RX WTRU may transmit a PSICH transmission (e.g., based on the RX WTRU detecting a trigger that there is a conflict) to a TX WTRU (e.g., the conflicting TX WTRU, as shown by example in FIG. 4B), where the conflicting TX WTRU is requesting to reserve a resource that overlaps with an already reserved resource (e.g., a resource already reserved by a reserving TX WTRU, as shown by example in FIG. 4B). For example, the RX WTRU may transmit a PSICH transmission to the conflicting TX WTRU if (e.g., when) $prio_{TX\_1} < prio_{TX\_2}$ (e.g., $prio_{TX\_1}$ indicating a higher priority in FIG. 4B, for example, a lower value of prio may indicate a higher priority). An RX WTRU may transmit a PSICH transmission (e.g., based on the RX WTRU detecting a trigger that there is a conflict) to the TX WTRU that transmitted the resource reservation that triggered the RX WTRU to monitor for a conflict (e.g., the reserving TX WTRU, as shown by example in FIG. 4A). For example, the RX WTRU may transmit a PSICH transmission to the reserving TX WTRU if (e.g., when) $prio_{TX\_1} > prio_{TX\_2}$ (e.g., $prio_{TX\_1}$ indicating a lower priority in FIG. 4A, for example, a higher value of prio may indicate a lower priority). The RX WTRU may detect the trigger that there is a conflict at the time of receiving the resource reservation from the conflicting TX WTRU. The RX WTRU may detect the trigger that there is a conflict at an offset time from the time of receiving the resource reservation from the conflicting TX WTRU (e.g., as shown in FIGS. 4A and 4B), for example, resulting from a conflict detection processing time associated with the RX WTRU). A PSICH transmission may comprise an indication to reselect a different resource. An RX WTRU may (e.g., with equal L1 priority) determine to refrain from sending (e.g., not send) a PSICH transmission, for example, if (e.g., when) a CBR measured at a resource conflict detection triggering occasion is higher than a (e.g., (pre) configured) SL CBR threshold. An RX WTRU may (e.g., with equal L1 priority), for example, randomly select a TX WTRU to perform a PSICH transmission. An RX WTRU may transmit simultaneous PSICH transmissions to reserving and conflicting TX WTRUs at the same PSICH transmission occasion, for example, if (e.g., when) a conflict detection includes multiple (e.g., two) reserved resources and/or a conflict is detected in each of the multiple resources. An RX WTRU may perform a TX power sharing between the simultaneous PSICH transmissions.

Figure 4C:
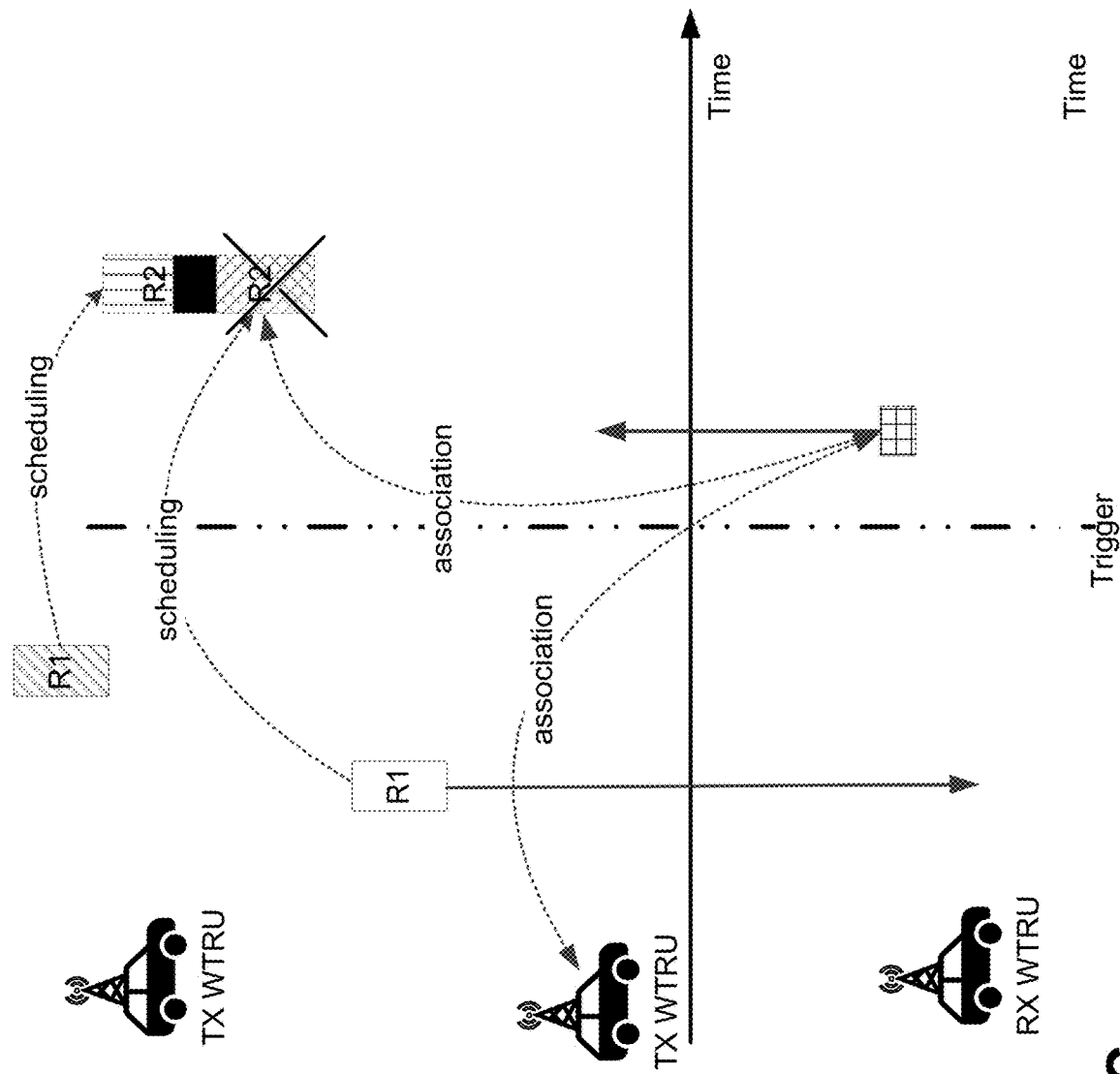

FIGS. 4A-C illustrate examples of PSICH transmissions.

An RX WTRU may determine a TX WTRU and/or corresponding information for PSICH transmission, for example, based on the ConflictDetEnabled and/or ConflictIndEnabled indication in the SCIs. An RX WTRU may (e.g., determine to) refrain from transmitting (e.g., not transmit) a PSICH transmission to a TX WTRU with an indication of ConflictDetEnabled and/or ConflictIndEnabled set as "disabled" in the SCI. For example, a TX WTRU may refrain from performing (e.g., not be (pre)configured for) conflict detection and indication (e.g., due to a HW limitation). A TX WTRU may indicate "disabled" in ConflictDetEnabled in an SCI reserving SL resources. A resource reserved by a TX WTRU may not be subject to conflict detection or indication.

In some examples, a TX WTRU may indicate "enabled" for ConflictDetEnabled and "disabled" for ConflictIndEnabled (e.g., a VRU device performing random resource selection without receiving capability). A RX WTRU may transmit a PSICH transmission to the conflicting TX WTRU, for example, if (e.g., when) the RX WTRU detects a collision in resources reserved by a TX WTRU (e.g., a VRU device). A RX WTRU may indicate (e.g., in a PSICH transmission) to the conflicting TX WTRU to perform resource re-selection, for example, so that the reserving TX WTRU may proceed to transmit in the reserved resources without collision.

An RX WTRU may determine a TX WTRU and/or corresponding information for a PSICH transmission, for example, based on the resource reservation period in the SCI. An RX WTRU may determine which TX WTRU (e.g., from multiple TX WTRUs) to transmit a PSICH transmission to, for example, based on the resource reservation period indicated in the SCI of the conflicting TX WTRU (e.g., $P_{rsvp\_TX\_2}$) and/or reserving TX WTRU (e.g., $P_{rsvp\_TX\_1}$). An RX WTRU may determine that a detected conflict is a one-time conflict between an aperiodic transmission and a periodic transmission, for example, if (e.g., when) $P_{rsvp\_TX\_2}=0$ and $P_{rsvp\_TX\_1}>0$ and/or if (e.g., when) $P_{rsvp\_TX\_1}=0$ and $P_{rsvp\_TX\_2}>0$. An RX WTRU may (e.g., determine to) transmit a PSICH transmission to a TX WTRU with a (e.g., periodic) resource reservation (e.g., a reservation with $P_{rsvp\_TX}>0$). An RX WTRU may (e.g., determine to) indicate to a TX WTRU to re-select a resource, for example, so that the (e.g., aperiodic) transmission may be performed without collision. In some examples, an RX WTRU may receive configuration information indicating (e.g., be (pre)configured with) a priority threshold and/or may (e.g., determine to) transmit a PSICH transmission to a reserving TX WTRU with a periodic resource reservation (e.g., with $P_{rsvp\_TX\_2}>0$), for example, if (e.g., when) $prio_{TX\_2}>$priority threshold. An RX WTRU may (e.g., thus) indicate to a reserving TX WTRU to re-select a periodic resource to avoid collision with an aperiodic transmission by a conflicting WTRU, for example, if (e.g., when) the L1 priority of the transmission by the conflicting WTRU is higher than the (e.g., (pre)configured) threshold (e.g., priority threshold).

Figure 5A:
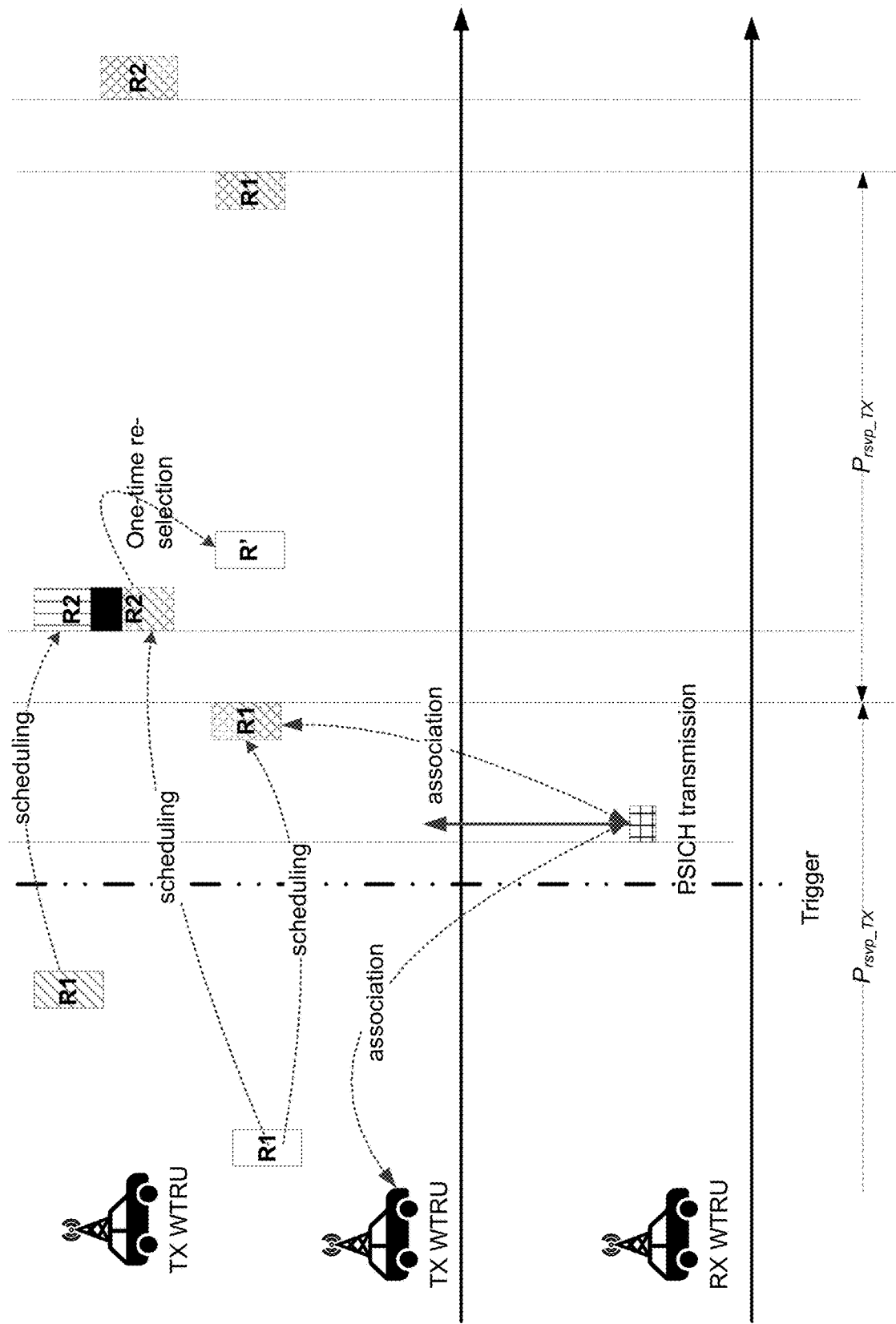
FIG. 5A illustrates an example of PSICH transmission for one-time resource reselection.

An RX WTRU may (e.g., determine to) transmit a PSICH transmission to indicate a one-time or periodical resource re-selection, e.g., based on the type of detected conflict, for example, if (e.g., when) $P_{rsvp\_TX\_2}=0$ and $P_{rsvp\_TX\_1}>0$. An RX WTRU may indicate a one-time resource re-selection in the PSICH transmission to the reserving TX WTRU (e.g., as shown by example in FIG. 5A), for example, if (e.g., when) a one-time conflict is detected and $prio_{TX\_1}>pro_{TX\_2}$. A resource re-selection may (e.g., thus) be limited to a (e.g., one) period of periodic resource reservation. An RX WTRU may indicate a periodic resource re-selection in the PSCIH transmission to the reserving TX WTRU (e.g., as shown by example in FIG. 5B), for example, if (e.g., when) a periodic conflict is detected and $pro_{TX\_1}>prio_{TX\_2}$. A resource re-selection may be performed for one or more (e.g., all) periods of a resource reservation.

Figure 5B:
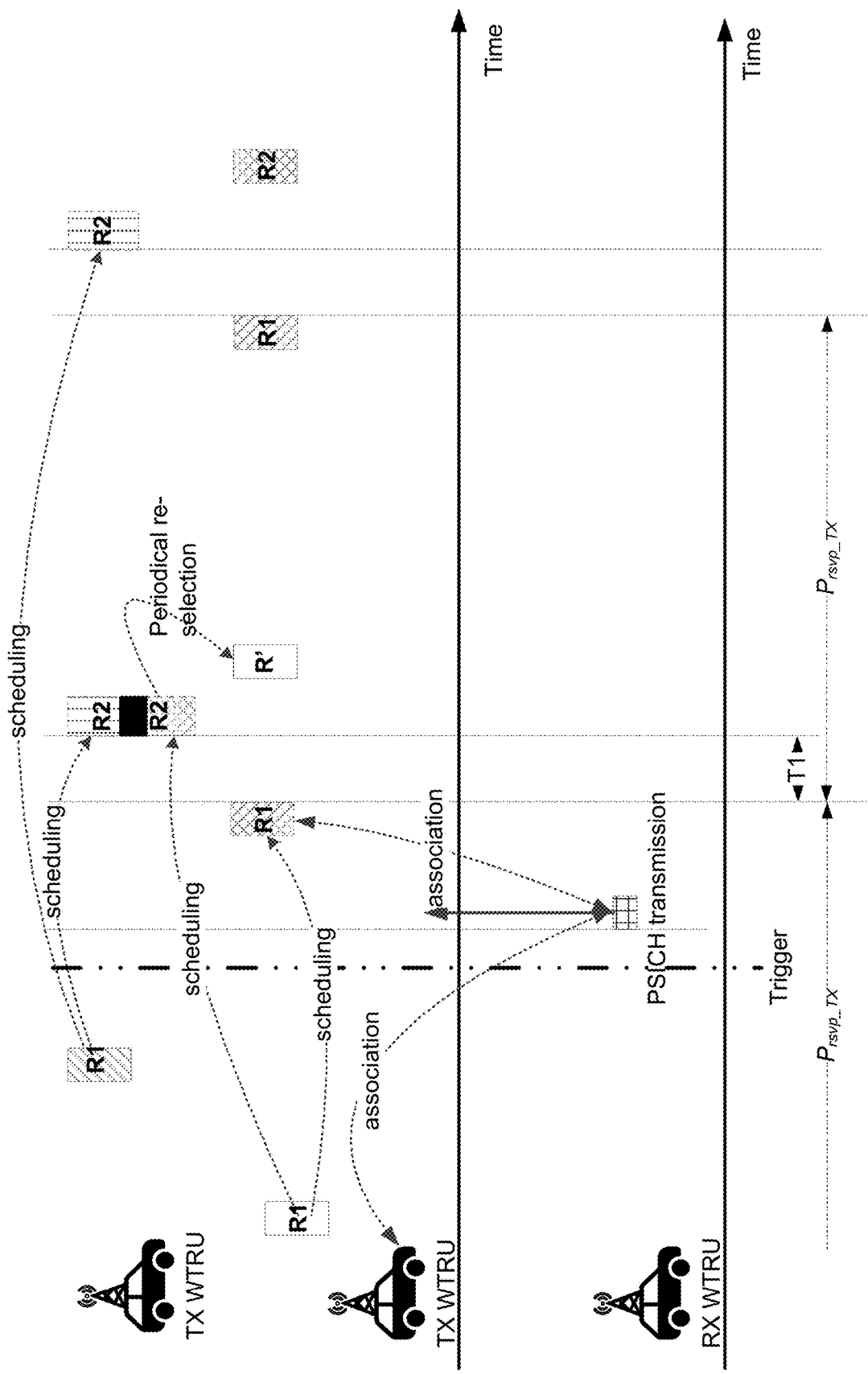
FIG. 5B illustrates an example of PSICH transmission for periodic resource reselection.

FIG. 4A illustrates an example of PSICH transmission for one-time resource reselection. FIG. 5B illustrates an example of PSICH transmission for periodic resource reselection.

An RX WTRU may determine a TX WTRU and/or corresponding information for a PSICH transmission, for example, based on the decoding status of a PSSCH transmission associated with the SCI reserving the resources. An RX WTRU may determine which TX WTRU to transmit a PSICH transmission to, for example, based on the decoding status of the PSSCH transmission associated with the SCI from the reserving TX WTRU. An RX WTRU may transmit a PSICH transmission to the reserving TX WTRU to cancel the re-transmissions (e.g., as shown by example in FIG. 4C), for example, if (e.g., when) the decoding status is a CRC check (e.g., the PSSCH transmission is decoded correctly). A cancellation may allow a transmission by a conflicting TX WTRU to be performed without collision.

An RX WTRU may determine a TX WTRU and corresponding information for PSICH transmission, for example, based on the WTRU source and/or destination ID indicated in the SCIs reserving the resource in conflict. In examples, an RX WTRU may determine which TX WTRU to send a conflict indication transmission (e.g., in a PSICH transmission), for example, based on a WTRU source and/or destination ID indicated in the SCIs reserving the resource in conflict. In examples, an RX WTRU may determine to transmit a PSICH transmission to a TX WTRU whose SCI indicates a WTRU source and/or destination ID associated with V2X services and/or SL applications to which the RX WTRU subscribes. The RX WTRU may indicate to the TX WTRU in the PSICH transmission to perform resource re-selection.

An RX WTRU may determine a TX WTRU and corresponding information for PSICH transmission, for example, based on the power saving state indicated in the SCI reserving the resources. A WTRU may determine to refrain from sending (e.g., not to send) a conflict indication transmission (e.g., in a PSICH transmission) to a TX WTRU, for example, if (e.g., when) a SL power saving state indication included in the SCI reserving the resource in conflict from the TX WTRU indicates a state of reduced power consumption. For example, a TX WTRU in such a reduced power consumption state may refrain from performing (e.g., not perform) sensing and/or SL reception and as a result may refrain from receiving (e.g., not be able to receive) and/or act on a conflict indication transmission. An RX WTRU may transmit a conflict indication to the (e.g., other) TX WTRU reserving the resource in conflict and indicate a resource re-selection.

An RX WTRU may determine a TX WTRU and corresponding information for PSICH transmission, for example, based on the resource allocation scheme indicated in the SCI reserving the resources. In examples, an RX WTRU may determine to refrain from sending (e.g., not to send) a conflict indication transmission (e.g., in a PSICH transmission) to a TX WTRU, for example, if (e.g., when) the TX WTRU applies a random resource selection and/or (e.g., partial) sensing-based resource selection. The resource selection scheme may be indicated in the SCI from the TX WTRU reserving the resource in conflict. An RX WTRU may transmit a conflict indication to the (e.g., other) TX WTRU reserving the resource in conflict and indicate a resource re-selection.

An RX WTRU may determine a TX WTRU and corresponding information for PSICH transmission, for example, based on the WTRU type indicated in the SCI reserving the resources. In examples, a RX WTRU may determine to refrain from sending (e.g., not send) a conflict indication transmission (e.g., in a PSICH transmission), for example, to a TX WTRU that may be a vulnerable roader user (VRU), a low power wearable device, and/or a WTRU with limited HW capability. Such a WTRU type indication may be included in the SCI from a TX WTRU reserving the resource in conflict. An RX WTRU may transmit a conflict indication to the (e.g., other) TX WTRU reserving the resource in conflict and indicate a resource re-selection.

An RX WTRU may determine a TX WTRU and corresponding information for PSICH transmission, for example, based on the SL RSRPs of PSCCH carrying the SCIs reserving the resources in conflict. An RX WTRI may determine which TX WTRU to send a conflict indication transmission (e.g., in a PSICH transmission), for example, based on a measured RSRP of the PSCCH transmission carrying the SCI reserving the resource in conflict. In examples, an RX WTRU may transmit a PSICH transmission to a TX WTRU with the highest measured RSRP value. In examples, an RX WTRU may transmit a PSICH transmission to a TX WTRU with the highest measured RSRP value above a (e.g., (pre)configured) RSRP threshold.

An RX WTRU may determine a TX WTRU and corresponding information for PSICH transmission, for example, based on the distance between the RX WTRU and TX WTRUs reserving the resource in conflict. An RX WTRU may determine which TX WTRU to send a conflict indication transmission (e.g., in a PSICH transmission), for example, based on a computed TX-RX distance between the RX WTRU and each TX WTRU reserving the resource in conflict. An RX WTRU may compute a TX-RX distance, for example, based on the zone ID indicated in the SCIs from the TX WTRUs. An RX WTRU may transmit a PSICH transmission to a TX WTRU, for example, if (e.g., when) the TX-RX distance is within the MCR indicated in the SCI from the TX WTRU. In examples, an RX WTRU may transmit a PSICH transmission to a TX WTRU with the smallest TX-RX distance and within the MCR indicated in the SCI from the TX WTRU.

An RX WTRU may determine a TX WTRU and corresponding information for PSICH transmission, for example, based on the type of conflict detected in the resource in conflict. The RX WTRU may determine to send a PSICH transmission or PSFCH transmission to the TX WTRU, for example if (e.g., when) an RX WTRU detects a same-slot conflict (e.g., as described herein regarding an RX WTRU's determination of a same-slot conflict due to overlapping resource reservations). The PSICH transmission may include an indication for a re-transmission of the TB transmitted in the resource in conflict by the TX WTRU.

An RX WTRU may determine to send a conflict indication transmission (e.g., a PSICH transmission), for example, if (e.g., when) an RX WTRU detects a conflict due to previously received resource reservation (e.g., as described herein regarding an RX WTRU's determination of a conflict due to previously received resource reservations). An RX WTRU may determine to send a conflict indication transmission (e.g., a PSICH transmission), for example, based on the priority of the TB associated with the previously received resource reservation and the priority indicated in the SCI reserving the resource (e.g., if (e.g., when) an RX WTRU detects a conflict due to previously received resource reservation). An RX WTRU may send a conflict indication transmission to the TX WTRU with the highest priority indicated in the SCI reserving the resource in conflict.

An RX WTRU may determine to send a conflict indication transmission (e.g., a PSICH transmission) to the TX WTRU, for example, if (e.g., when) an RX WTRU detects a conflict due to its scheduled SL or UL transmission (e.g., as described herein regarding an RX WTRU's determination of a conflict due to its scheduled SL or UL transmissions). An RX WTRU may determine to send a conflict indication transmission (e.g., a PSICH transmission) to the TX WTRU (e.g., if (e.g., when) an RX WTRU detects a conflict due to its scheduled SL or UL transmission), for example, if (e.g., when) the priority of the TB for the SL or UL transmission is higher than the priority indicated in the SCI reserving the resource. An RX WTRU may indicate a resource re-selection in the PSICH transmission. An RX WTRU may determine to refrain from sending (e.g., not send) a PSICH transmission and drop the SL or UL transmission and receive the SL TB in the reserved resource (e.g., as indicated in the SCI from the TX WTRU), for example, if (e.g., when) the priority of the TB of the SL or UL transmission is lower than the priority indicated in the SCI reserving the resource. A higher priority may correspond to a smaller numeric value in the priority bit field of an SCI.

An RX WTRU may determine a PSICH transmission format and/or resource(s). A WTRU may receive configuration information indicating (e.g., be (pre)configured with, e.g., by higher layers), for example, one or more of the following for conflict indication transmission: a PSICH transmission format; a PSFCH transmission format; and/or a PSICH transmission resource configuration.

A WTRU may receive configuration information indicating (e.g., be (pre)configured with) a PSICH transmission format. In some examples, a PSICH transmission format may be based on a sequence, e.g., a Zadoff Chu (ZC) sequence. A WTRU may generate a PSICH transmission sequence (e.g., a ZC sequence cycle shift value) and/or convey the SL conflict detection and indication information in a selected PSICH transmission sequence. A PSICH transmission format may include one or more (e.g., a number of) bit fields. A (e.g., each) bit field may include (e.g., be (pre)configured with) a set of code points. A WTRU may indicate related information using code point values in the PSICH transmission bit fields.

In some examples, a PSICH transmission may indicate information that may be applicable to a resource reserved in a received SCI, for example, if (e.g., when) a SL resource conflict is detected in the resource. A PSICH transmission may indicate, for example, one or more of the following: an indication for a re-transmission of the SL TB transmitted in the PSSCH transmission associated with the received SCI; an indication for a cancellation of re-transmissions of the SL TB scheduled in the resource(s) reserved in the received SCI; an indication for a one-time resource re-selection (e.g., a re-selection of a single resource reserved in the received SCI), for example, for an initial transmission of an (e.g., a new) SL TB associated with the same WTRU source and/or destination ID as the one(s) indicated in the received SCI and/or for a re-transmission of the SL TB transmitted in the PSSCH associated with the received SCI; and/or a request for a periodical re-selection (e.g., a re-selection of resources periodically reserved in the received SCI), for example, for initial transmissions and re-transmissions of (e.g., new) SL TBs associated with the same WTRU source and/or destination ID as the one(s) indicated in the received SCI.

In some examples, a WTRU may include an SL resource conflict and/or indication information for a resource reserved in a received SCI (e.g., along with HARQ feedback information) in a PSFCH transmission format (e.g., if/when HARQ is enabled for the SL TB). The PSFCH transmission format may indicate, for example, one or more of the following: a HARQ ACK for an SL TB transmitted in the PSSCH transmission associated with the received SCI; a HARQ NACK for an SL TB transmitted in the PSSCH transmission associated with the received SCI and/or an indication for a HARQ re-transmission in the resource reserved in the received SCI; and/or a HARQ NACK for an SL TB transmitted in the PSSCH transmission associated with the received SCI and/or an indication for a HARQ re-transmission with resource re-selection (e.g., a HARQ re-transmission in a different resource than the one reserved in the received SCI due to detected conflict).

An RX WTRU may indicate a HARQ NACK and resource re-selection in a PSFCH transmission, for example, if (e.g., when) the RX WTRU detects a conflict in the resource reserved for the HARQ re-transmission.

A WTRU may receive configuration information indicating (e.g., be (pre)configured with) PSICH resources. A (e.g., each) resource may include, for example, a PSICH transmission occasion, a PSICH frequency resource, and/or a PSICH sequence. In some examples, a PSICH transmission occasion may be an SL slot. A number of periodic SL slots in a resource pool may be indicated (e.g., (pre)configured), for example, as PSICH transmission occasions. A WTRU may (e.g., within a PSICH transmission occasion) perform PSICH transmission at one or more (e.g., a number of) indicated (e.g., (pre)configured) PSICH symbols, for example, where no PSSCH/PSCCH transmissions may be performed. A conflict detection and indication may be disabled in a resource pool, for example, if (e.g., when) no PSICH transmission occasions are indicated (e.g., (pre) configured) in a resource pool.

In some examples, a PSICH transmission may be based on a (e.g., single) physical resource block (PRB), for example, for sequence based PSICH transmission format. A number of PRBs may be indicated (e.g., (pre)configured) in a resource pool for PSICH transmissions. A set of orthogonal sequences (e.g., ZC sequences with different cyclic shifts) may be indicated (e.g., (pre)configured). Multiple PSICH transmissions may be code-domain-multiplexed within a (e.g., one) PRB at a PSICH transmission occasion. A PSICH resource may (e.g., therefore) be identified with an index based on the PRB and/or sequence used in the PRB.

An RX WTRU may determine a resource for a PSICH transmission in a determined PSICH transmission occasion to a determined TX WTRU, for example, based on one or more of the following: a WTRU source/destination ID of the determined TX WTRU (e.g., $WTRU_{ID}$); an index of the SL slot in which the SCI reserving the resource is received (e.g., $Index_{slot}$); an index of the SL slot of the determined PSICH transmission occasion (e.g., $Index_{slot}$); a PSCCH sub-channel reserved by the determined TX WTRU; and/or a PSSCH sub-channel(s) reserved by the determined TX WTRU.

In some examples, an RX WTRU may determine an index of a PSICH resource corresponding to a reserved resource (e.g., as $WTRU_{ID}+Index_{slot})MOD(N_{PSICH\_resource})$. $N_{PSICH\_resource}$ may be the total of a set of PSICH resources determined within the PRBs of the PSSCH sub-channels and/or within the PRBs of a PSCCH sub-channel reserved in the resource reservation for the conflict detection.

In some examples, a frequency resource of a PSICH transmission may be based on a (e.g., single) sub-channel. A WTRU may determine a sub-channel for PSICH transmission, for example, based on Mode 2 sensing. A WTRU may perform a sub-channel-based PSICH transmission at (e.g., (pre)configured) symbols within a PSICH transmission occasion.

An RX WTRU may determine a PSICH transmission power and concurrent PSICH and PSFCH transmissions. An RX WTRU may receive configuration information indicating (e.g., be (pre)configured with) one or more of the following for a PSICH transmission power setting for (e.g., single) PSICH transmission and concurrent PSICH and/or PSFCH transmissions: a PSICH transmission power offset ($P_{0\_PSICH}$); a path loss compensation factor (alpha); a downlink path loss (DLPL); an SL path loss (SLDL); a maximum total number of concurrent PSICH and/or PSFCH transmissions ($N_{max}$); an SCS numerology (u); a (e.g., (pre)configured) maximum SL power ($P_{SL\_MAX}$); and/or a (e.g., (pre)configured) maximum SL power if (e.g., when) a measured SL CBR exceeds a (e.g., (pre)configured) CBR threshold ($P_{SL\_MAX\_CBR}$).

An RX WTRU may select which path loss to apply for a PSICH transmission power setting, for example, based on the TX WTRU selected for the PSICH transmission (e.g., as described herein). An RX WTRU may set the power of a PSICH transmission ($P_{PSICH,\ single}$) as one of the following: a downlink path loss (DLPL) for single PSICH transmission power setting; and/or an SL pathloss (SLPL) for single PSICH transmission power setting.

An RX WTRU may determine to use a downlink path loss (DLPL) for single PSICH power setting, for example, if (e.g., when) transmitting a PSICH transmission to a selected TX WTRU and the WTRU source and/or destination ID indicated in the SCI transmitted by this TX WTRU is not associated with the V2X service and/or SL applications subscribed to by the RX WTRU. An RX WTRU may estimate the DLPL, for example, based on the (e.g., same) downlink RSs used for the DLPL estimate for PUSCH transmission. An RX WTRU may set a single PSICH transmission power as one of the following: $P_{PSICH,\ single}=\text{minimum}(P_{SL\_MAX},\ P_{0\_PSICH}+10\ \log10(2^U)+\text{Alpha}*\text{DLPL})$ dBm; $P_{PSICH,\ single}=\text{minimum}(P_{SL\_MAX\_CBR},\ P_{0\_PSICH}+10\ \log10(2^U)+\text{Alpha}*\text{DLPL})$ dBm, e.g., if (e.g., when) an RX WTRU measures a SL CBR above a (e.g., (pre)configured) CBR threshold; or if the RX WTRU is out of NW coverage, an RX WTRU may apply a (pre)configured maximum SL power as following: $P_{PSICH,single}=P_{SL\_max}$ dBm and $P_{PSICH,single}=P_{SL\_max\_CBR}$ dBm (e.g., if/when an RX WTRU measures a SL CBR above a (pre)configured CBR threshold).

An RX WTRU may determine to use an SL path loss (SLPL) for single PSICH power setting, for example, if (e.g., when) transmitting a PSICH transmission to a selected TX WTRU and the WTRU source and/or destination ID indicated in the SCI transmitted by this TX WTRU is associated with the V2X service and/or SL applications subscribed to by the RX WTRU. An RX WTRU may estimate the DLPL, for example, based on the (e.g., same) downlink RSs used for the DLPL estimate for PUSCH transmission. An RX WTRU may set a single PSICH power as one of the following: $P_{PSICH,\ single}=\text{minimum}(P_{SL\_MAX},\ P_{0\_PSICH}+10\ \log10(2^U)+\text{Alpha}*\text{SLPL})$ dBm (e.g., where SLPL is the estimate SL path loss based on a SL RS, e.g., SL CSI-RS, PSCCH DMRS and/or PSSCH DMRS transmitted by the TX UE the PSICH transmission is intended for) or $P_{PSICH,\ single}=\text{minimum}(P_{SL\_MAX\_CBR},\ P_{0\_PSICH}+10\ \log10(2^U)+\text{Alpha}*\text{SLPL})$ dBm (e.g., if/when an RX WTRU measures a SL CBR above a (pre)configured CBR threshold).

A PSICH transmission occasion may (e.g., fully) overlap with a PSFCH transmission occasion(s). An RX WTRU may perform concurrent PSICH and PSFCH transmissions at the (e.g., same) symbol locations within a SL slot. An RX WTRU may receive configuration information indicating (e.g., be (pre)configured) with a (e.g., maximum) total number ($N_{max}$) of PSICH and PSFCH transmissions at a (e.g., one) PSFCH and/or PSICH transmission occasion. An RX WTRU may perform a prioritization to determine which PSICH and/or PSFCH transmission to perform. The performed prioritization may be associated with one or more of the following: an available maximum power, a determined/scheduled PSICH and/or PSFCH transmission; or an actual number of PSICH/PSFCH transmissions.

An RX WTRU may determine an available maximum power as $P_{max}$ or $P_{max\_CBR}$, for example, if (e.g., when) an RX WTRU measures a SL CBR above a (e.g., (pre)configured) threshold.

An RX WTRU may perform (e.g., all, such as $N_{scheduled}$) determined and/or scheduled PSICH and/or PSFCH transmissions, for example, if (e.g., when) the number of determined and/or scheduled PSICH and/or PSFCH transmissions (e.g., $N_{scheduled}$) is below or equal to the (e.g., (pre) configured) maximum number (e.g., $N_{max}$) and the total power is smaller or equal to the determined available maximum power.

An RX WTRU may perform a prioritization of determined and/or scheduled ($N_{scheduled}$) PSICH/PSFCH transmissions and may determine an actual number ($N_{actual}$) of PSICH/PSFCH transmissions, for example, based on whether the number of determined/scheduled PSICH and/or PSFCH transmissions ($N_{scheduled}$) is below or equal to the (e.g., (pre)configured) maximum number ($N_{max}$) and the total power is larger than determined available maximum power, or the number of determined and/or scheduled PSICH and/or PSFCH transmissions ($N_{scheduled}$) is larger than the (e.g., (pre)configured) maximum number ($N_{max}$). An RX WTRU may determine to perform an actual number ($N_{actual}$) of PSICH and/or PSFCH transmissions (e.g., which may be smaller than the scheduled number) with descending priority order (e.g., with ascending priority indication value order), for example, based on the SL priority associated with the PSICH and/or PSFCH transmissions. The priority may be indicated in the SCI reserving the resource(s) corresponding to a PSICH transmission and the SCI associated with the PSSCH corresponding to a PSFCH transmission. An RX WTRU may determine such an actual number ($N_{actual}$) so the sum of the determined PSICH and/or PSFCH transmission power is below or equal to the determined available maximum power. An RX WTRU may prioritize to allocate available power to the PSICH/PSFCH transmissions with highest SL priorities and drop the ones with lowest priorities.

An RX WTRU may determine to perform a resource information transmission to a TX WTRU. In examples, an RX WTRU may determine to transmit an (e.g., explicit) set of resources in conflict to a TX WTRU. In examples, an RX WTRU may determine such resources in conflict, for example, based on the excluded resources the RX WTRU determines by sensing, resources reserved in previously received SCIs (e.g., as described herein regarding an RX WTRU's determination of a conflict due to previously received resource reservations) and resources scheduled/reserved for the RX WTRU's own transmissions (e.g., as described herein regarding an RX WTRU's determination of a conflict due to its scheduled SL or UL transmissions).

In the conflict-related information transmission, an RX WTRU may include a WTRU source and/or destination ID associated with the set of resources in conflict. The WTRU source and/or destination ID may be associated with V2X service and/or SL applications to which the RX WTRU subscribes. In examples, the WTRU source and/or destination ID may be indicated in the (e.g., explicit) request from the TX WTRU. In examples, the WTRU source and/or destination ID may be indicated in a resource reservation from the TX WTRU. An RX WTRU may include both a source and destination ID assigned to the unicast transmission (e.g., by higher layers, for example higher layer signaling), for example, for a unicast transmission between a TX WTRU and RX WTRU. An RX WTRU may include a destination ID assigned to the groupcast and broadcast transmission (e.g., by higher layers, for example higher layer signaling), for example, for groupcast and broadcast transmission.

An RX WTRU may determine (e.g., all) resources in conflict, for example, during a resource selection window. An RX WTRU may be indicated with a such resource selection window in an (e.g., explicit) request for the resource set from a TX WTRU. In examples, an RX WTRU may receive configuration information indicating (e.g., be (pre)configured with) a resource selection window for the determination of the resources in conflict. An RX WTRU may include the resource selection window information, for example, in the resource set transmitted to the TX WTRU. An RX WTRU may include its zone ID and/or SL RSRP value measured on the TX WTRU's (e.g., explicit) request and/or SCI reserving previous resources in the resource set.

An RX WTRU behavior of SCI decoding may be based on the resource information transmission to TX WTRU. An RX WTRU may receive configuration information indicating (e.g., be (pre)configured with) a PSCCH resource candidate that may include a number of (e.g., consecutive) symbols starting from a second SL symbol in a SL slot of the SL resource pool and/or a number of PRBs starting from the lowest PRB of a sub-channel of the SL resource pool.

An RX WTRU may receive configuration information indicating (e.g., be (pre)configured with) a PSCCH decoding resource allocation. The allocation may be, for example, a number of sub-channels of a resource pool, a resource pool, or a set of resource pools. The (e.g., multiple) resource pools may be located in a (e.g., one) SL BWP or different SL BWPs. The SL BWPs may be located in different SL carriers. An RX WTRU may be (pre)configured with a set of such PSCCH decoding resource allocations and the (e.g., each such) resource allocation may be associated with one or more of the following: a WTRU source and/or destination ID associated with V2X service and/or SL application the RX WTRU subscribed to (e.g., SL URLLC traffic); a power saving state (e.g., an ACTIVE state, ON duration, an INACTIVE state, OFF duration); or a WTRU capability and/or type (e.g., a RedCap WTRU with small bandwidth).

An RX WTRU may determine a PSCCH decoding resource allocation, for example, based on the resources provided to a TX WTRU. In examples, a PSCCH may determine to exclude the PSCCH resource candidates within the resources provided to a TX WTRU from a PSCCH decoding resource allocation. For example, the SL slots and sub-channels included in a set of resources in conflict provided to the TX WTRU may be refrained from being monitored (e.g., not be monitored) by the RX WTRU for SCI decoding for the transmission from the TX WTRU.

In examples, an RX WTRU may send a TX WTRU an (e.g., explicit) set of resources to apply (e.g., the set of resources without conflict). An RX WTRU may prioritize the SCI decoding of the PSCCH resource candidates within the SL slots and sub-channels included in the resources provided to the TX WTRU.

An RX WTRU may perform the exclusion and/or prioritization of the PSCCH resource candidates (e.g., as described herein) during a resource selection window indicated in the resource set sent to the TX WTRU. An RX WTRU may provide such resource sets to different TX WTRUs. The RX WTRU may determine in a (e.g., each) SL slot which PSCCH resource candidates to exclude and/or prioritize, for example, based on a semi-persistent resource reservation made by each TX WTRU in the SL slot.

A TX WTRU may determine that a conflict detection and indication may be performed with regard to a resource reservation indicated in an SCI associated with a performed SL transmission. A determination may be based on, for example, one or more of the following (e.g., as may be described herein with respect to SL resource conflict and indication (pre)configuration): a sub-set of WTRU source(s) and/or destination IDs; an SL priority threshold (e.g., $Prio_{thre}$); an enabled/disabled indication for inter-WTRU coordination and/or conflict detection (e.g., ConflictDetEnabled); and/or an enabled/disabled indication for inter-WTRU coordination and/or conflict indication (e.g., ConflictIndEnabled).

A TX WTRU may determine a corresponding PSICH transmission occasion for PSICH monitoring for a (e.g., each) reserved resource, for example, as described herein (e.g., with respect to RX WTRU determination of conflict detection occasion(s) of resource(s) reserved in a received SCI). A TX WTRU and an RX WTRU may identify the same PSICH transmission occasion for resource(s) received in a received SCI. A TX WTRU may determine a corresponding PSICH transmission occasion for PSICH monitoring for a (e.g., each) reserved resource, for example, based on one or more of the following: a conflict detection processing time (e.g., $T_{proc}$;) and/or a conflict indication transmission processing time (e.g., $T_{PSICH}$).

A TX WTRU may determine a PSICH resource, for example, based on one or more of the following (e.g., as described herein according to an RX WTRU determination of PSICH transmission format and resource): a WTRU source and/or destination ID indicated in an SCI reserving the resource(s); an index of the SL slot of the SCI transmission (e.g., $Index_{slot}$); an index of the SL slot of the determined PSICH transmission occasion (e.g., $Index_{slot}$); a PSCCH sub-channel reserved by the determined TX WTRU; and/or a PSSCH sub-channel(s) reserved by the determined TX WTRU.

A TX WTRU may monitor a PSICH transmission using a determined resource at the determined PSICH transmission occasion, for example, if (e.g., when) the TX WTRU determines a conflict detection and indication is enabled for a resource reservation transmitted in an SCI. A TX WTRU may (e.g., if/when the TX WTRU does not receive a PSICH transmission) disable a pre-emption (e.g., if pre-emption is (pre)configured in a resource pool) for the reserved resource(s) and/or may proceed with initial transmission and/or re-transmissions in the reserved resources. Pre-emption may detect a conflict for reserved resource(s) at a TX WTRU. A conflict detected RX WTRU may be insufficient for a TX WTRU to skip pre-emption and reduce processing.

A TX WTRU may (e.g., if/when the TX WTRU receives a PSICH transmission) disable a pre-emption (e.g., if pre-emption is (pre)configured in a resource pool) and/or may perform one or more of the following (e.g., based on the information indicated in the PSICH for a (each) reserved resource): stop re-transmission(s) (e.g., if/when a PSICH indicates cancellation of the re-transmission(s)); perform a re-selection for an aperiodic reserved resource and/or for a (e.g., one) period of a periodic reserved resource (e.g., if/when PSICH indicates a one-time resource conflict and/or re-selection); perform a re-selection for one or multiple (e.g., all) periods of a periodic reserved resource (e.g., if/when PSICH indicates a periodic resource conflict and/or re-selection); and/or perform a re-transmission if/when a PSICH transmission indicates a re-transmission).

A TX WTRU may determine resources in conflict, for example, based on multiple received sets of resources in conflict. In examples, a TX WTRU may receive transmissions from multiple RX WTRUs and each transmission may include an (e.g., explicit) set of resources. A TX WTRU may determine which set(s) of resources to use for a SL transmission, for example, based on information included in the resource set from the RX WTRU and/or a parameter of the SL transmission by the TX WTRU. Information included in the resource set from the RX WTRU may include a WTRU source and/or destination ID, a resource selection window, a zone ID, and/or an SL RSRP measured on the TX WTRU.

A parameter of the SL transmission by the TX WTRU may include a WTRU source and/or destination ID associated with the TB to transmit, an MCR of the TB to transmit, and/or a resource selection window.

In examples, a TX WTRU may determine to apply a resource set when one or more of the following conditions are satisfied: a WTRU source and/or destination ID indicated in the received resource set are identical to the ones associated with the SL TB to transmit; a TX-RX distance (e.g., computed based on the Zone ID indicated in the received resource set and TX UE's own geographic location) is smaller or equal to the MCR of the TB to transmit; the SL RSRP indicated in the received resource set is higher than a (e.g., (pre)configured) SL RSRP threshold associated with the MCR of the TB to transmit; or the resource selection window indicated in the resource set overlap with the resource selection window determined for the TB to transmit.

A TX WTRU may accordingly determine a resource set (e.g., multitude of the received resource sets) to apply to the resource selection for the SL TB transmission. In examples, a TX WTRU may determine a union of resources to include non-overlapping resources the TX WTRU may select from each determined received resource set. A TX WTRU may select resources from the overlapping section between the indicated resource selection window and the determined resource selection window of the TB to transmit.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A first wireless transmit/receive unit (WTRU) comprising:
    a processor configured to:
        receive configuration information indicating a conflict detection processing time, wherein the conflict detection processing time is a minimum time to report a conflict indication;
        receive first sidelink control information (SCI) from a second WTRU, wherein the first SCI indicates a first conflict indication setting and at least a first resource;
        receive second SCI from a third WTRU, wherein the second SCI indicates a second conflict indication setting and at least a second resource;
        determine that the first SCI and the second SCI are received at a time before a physical sidelink feedback channel (PSFCH) transmission, wherein the time before the PSFCH transmission is at least the conflict detection processing time before the PSFCH transmission;
        determine that at least the first resource and at least the second resource overlap; and send the PSFCH transmission to the second WTRU based on at least a determination that the first conflict indication setting is enabled, wherein the PSFCH transmission comprises a conflict indication.

2. The first WTRU of claim 1, wherein the processor is further configured to:
determine a measurement associated with the second SCI; and
determine that there is a conflict associated with the first resource and the second resource based on the determination that at least the first resource and at least the second resource overlap and based on a determination that the measurement associated with the second SCI is greater than a first threshold.

3. The first WTRU of claim 2, wherein the measurement associated with the second SCI is a reference signal received power (RSRP).

4. The first WTRU of claim 1, wherein the conflict detection processing time is a duration associated with conflict detection performed by the first WTRU and conflict indication sent by the first WTRU.

5. The first WTRU of claim 1, wherein the determination that at least the first resource and at least the second resource overlap is based on a determination that the first resource at least partially overlaps with the second resource.

6. The first WTRU of claim 1, wherein the processor is further configured to:
determine a conflict detection triggering occasion based at least on the conflict detection processing time and the first resource, wherein the second SCI is received during the conflict detection triggering occasion.

7. The first WTRU of claim 6, wherein the conflict detection processing time is a first conflict detection processing time associated with the third WTRU, and wherein the processor is further configured to:
receive an indication that indicates a second conflict detection processing time associated with the second WTRU, wherein the conflict detection triggering occasion is further determined based on the second conflict detection processing time associated with the second WTRU.

8. The first WTRU of claim 1, wherein the sent PSFCH transmission is further based on the determination that the first SCI and the second SCI are received at the time before the PSFCH transmission.

9. The first WTRU of claim 1, wherein the sent PSFCH transmission is further based on a determination that the second conflict indication setting is disabled.

10. A method, the method comprising:
receiving configuration information indicating a conflict detection processing time, wherein the conflict detection processing time is a minimum time to report a conflict indication;
receiving first sidelink control information (SCI) from a first wireless transmit/receive unit (WTRU), wherein the first SCI indicates a first conflict indication setting and at least a first resource;
receiving second SCI from a second WTRU, wherein the second SCI indicates a second conflict indication setting and at least a second resource;
determining that the first SCI and the second SCI are received at a time before a physical sidelink feedback channel (PSFCH) transmission, wherein the time before the PSFCH transmission is at least the conflict detection processing time before the PSFCH transmission;
determining that at least the first resource and at least the second resource overlap; and
sending the PSFCH transmission to the first WTRU based on at least a determination that the first conflict indication setting is enabled, wherein the PSFCH transmission comprises a conflict indication.

11. The method of claim 10, wherein the method further comprises:
determining a measurement associated with the second SCI; and
determining that there is a conflict associated with the first resource and the second resource based on the determination that at least the first resource and at least the second resource overlap and based on a determination that the measurement associated with the second SCI is greater than a first threshold.

12. The method of claim 11, wherein the measurement associated with the second SCI is a reference signal received power (RSRP).

13. The method of claim 10, wherein the conflict detection processing time is a duration associated with conflict detection performed by the first WTRU and conflict indication sent by the first WTRU.

14. The method of claim 10, wherein the determination that at least the first resource and at least the second resource overlap is based on a determination that the first resource at least partially overlaps with the second resource.

15. The method of claim 10, wherein the method further comprises:
determining a conflict detection triggering occasion based at least on the conflict detection processing time and the first resource, wherein the second SCI is received during the conflict detection triggering occasion.

16. The method of claim 15, wherein the conflict detection processing time is a first conflict detection processing time associated with the second WTRU, and wherein the method further comprises:
receiving an indication that indicates a second conflict detection processing time associated with the first WTRU, wherein the conflict detection triggering occasion is further determined based on the second conflict detection processing time associated with the first WTRU.

17. The method of claim 10, wherein the sent PSFCH transmission is further based on the determination that the first SCI and the second SCI are received at the time before the PSFCH transmission.

18. The method of claim 10, wherein the sent PSFCH transmission is further based on a determination that the second conflict indication setting is disabled.

19. A first wireless transmit/receive unit (WTRU) comprising:
a processor configured to:
receive configuration information indicating a conflict detection processing time, wherein the conflict detection processing time is a minimum time to report a conflict indication;
receive a first sidelink control information (SCI) from a second WTRU, wherein the first SCI indicates a first resource, a first conflict indication setting, and a first priority value, wherein the first conflict indication setting indicates whether the second WTRU supports receiving conflict information;
receive a second SCI from a third WTRU, wherein the second SCI indicates a second resource, a second conflict indication setting, and a second priority value, wherein the second conflict indication setting indicates whether the third WTRU supports receiving conflict information;

determine that the first SCI and the second SCI are received at a time before a physical sidelink feedback channel (PSFCH) transmission, wherein the time before the PSFCH transmission is at least the conflict detection processing time before the PSFCH transmission;

determine that at least the first resource and at least the second resource overlap;

determine an RSRP threshold based on the first priority value and the second priority value;

determine that a reference signal received power (RSRP) measurement associated with the second SCI is greater than an RSRP threshold;

determine that there is a conflict associated with the first resource and the second resource based on the determination that at least the first resource and at least the second resource overlap and based on the determination that the RSRP measurement associated with the second SCI is greater than the RSRP threshold; and send, based on the determination that at least the first resource and at least the second resource overlap, the PSFCH transmission to the second WTRU based on a determination that the first conflict indication setting is enabled and the second conflict indication setting is disabled or based on a determination that the first conflict indication setting is enabled, the second conflict indication setting is enabled, and the first priority value is greater than the second priority value, wherein the PSFCH transmission comprises a conflict indication.

* * * * *